United States Patent
Romanowich et al.

(10) Patent No.: US 8,284,254 B2
(45) Date of Patent: Oct. 9, 2012

(54) METHODS AND APPARATUS FOR A WIDE AREA COORDINATED SURVEILLANCE SYSTEM

(75) Inventors: John Frederick Romanowich, Skillman, NJ (US); Danny Chin, Princeton Junction, NJ (US); Geoffrey Alan Cleary, Ambler, PA (US)

(73) Assignee: Sightlogix, Inc., Princeton, NJ (US)

( * ) Notice: Subject to any disclaimer, the term of this patent is extended or adjusted under 35 U.S.C. 154(b) by 1756 days.

(21) Appl. No.: 11/201,728

(22) Filed: Aug. 11, 2005

(65) Prior Publication Data

US 2007/0039030 A1    Feb. 15, 2007

(51) Int. Cl.
*H04N 7/18* (2006.01)

(52) U.S. Cl. ........ 348/154; 348/143; 348/155; 348/159; 382/103

(58) Field of Classification Search ............. 348/143, 348/154, 155, 159; 382/103
See application file for complete search history.

(56) References Cited

U.S. PATENT DOCUMENTS

| | | | |
|---|---|---|---|
| 6,859,831 B1 * | 2/2005 | Gelvin et al. | 709/224 |
| 7,542,588 B2 * | 6/2009 | Ekin et al. | 382/103 |
| 2001/0043270 A1 * | 11/2001 | Lourie et al. | 348/155 |
| 2002/0063711 A1 * | 5/2002 | Park et al. | 345/428 |
| 2004/0109059 A1 * | 6/2004 | Kawakita | 348/143 |
| 2005/0012817 A1 * | 1/2005 | Hampapur et al. | 348/143 |
| 2010/0013933 A1 * | 1/2010 | Broad | 348/159 |

* cited by examiner

*Primary Examiner* — Sath V Perungavoor
*Assistant Examiner* — James Pontius
(74) *Attorney, Agent, or Firm* — Straub & Pokotylo; Michael P. Straub; Stephen T. Straub

(57) ABSTRACT

A coordinated surveillance system uses a larger number of fixed low resolution detection smart camera devices and a smaller number of pan/tilt/zoom controllable high resolution tracking smart camera devices. The set of detection cameras provide overall continuous coverage of the surveillance region, while the tracking cameras provide localized high resolution on demand. Each monitor camera device performs initial detection and determines approximate GPS location of a moving target in its field of view. A control system coordinates detection and tracking camera operation. A selected tracking camera is controlled to focus in on, confirm detection, and track a target. Based on a verified detection, a guard station is alerted and compressed camera video is forwarded to the guard station from the camera(s). The guard station can direct a patrol guard to the target using GPS coordinates and a site map.

29 Claims, 14 Drawing Sheets

METHODS AND APPARATUS FOR A WIDE AREA COORDINATED SURVEILLANCE SYSTEM

FIELD OF INVENTION

The present invention relates generally to systems and methods for surveillance, and more particularly to systems and methods for wide area coordinated surveillance systems using a mixture of different smart camera devices.

BACKGROUND

Many known surveillance systems have used a closed circuit television approach. In such an approach, a number of video cameras are mounted at different points; video coaxial cable is routed from each of the cameras to a centralized guard station; the outputs of the cameras are fed to video display monitors at the guard station. A guard typically monitors the closed circuit television displays in real time. The outputs of the video cameras may also be recorded on a tape which is typically overwritten after some specified amount of time. This approach relies on human monitoring of the closed circuit television displays to detect breaches in security. A guard is hired to sit at the guard station and continuously monitor multiple video screens. This approach is not reliable enough to achieve a high level of security, as guards hired to look at monitors all day long have a tendency to fall asleep, e.g., due to boredom. In some cases, the guards, who are not necessarily highly paid, have taken on the security guard job as a second job, and have a tendency to nap or fall sleep when left alone. In some cases, guards become pre-occupied with other distractions, e.g., newspapers, magazines, talking on the phone, watching or listening to a ball game, receiving a delivery package, etc., and may be distracted at a critical moment missing a security breach. Sometimes, guards also have to temporarily leave their station, e.g., to physically "make the rounds" checking out a number of designated sites and/or locks.

A single guard is limited as to how many monitors he/she can simultaneously view effectively before becoming overloaded. Therefore in surveillance systems including a large number of closed circuit television cameras, one approach employed to attempt to prevent guard overload is to hire a large number of guards, each guard being responsible for a fraction of the total number of displays. In this way, each of the displays can be simultaneously viewed with a higher level of confidence that security breaches will be detected. However, this approach is costly and still not highly reliable, since for the approach to achieve highly effective coverage all the guards need to continuously remain vigilant, an unlikely scenario. Another approach employed is to use a limited number of guards and switch between cameras; however, this results in incomplete continuous coverage increasing the likelihood of an undetected security breach.

Although it might seem that replacing humans with a fully computerized system might seem to be a viable alternative to increasing reliability and overall effectiveness, there is another problem which results. Computer programs have not reached the level of sophistication to match the judgment of a human; humans can adapt and adjust more readily to changes, different scenarios, and grey areas. Humans can also more readily distinguish suspicious individuals and patterns of suspicious behavior more readily than computers, e.g., profiling that there is no reason for certain suspicious looking individuals to be lingering at the border of a secure site at a certain time of day or performing some suspicious activity, e.g., photographing the site.

In some other known surveillance systems, closed circuit television cameras are installed and connected to recording devices which tape the camera video; however, a guard is not stationed to continuously monitor the video. Rather, the video is played back and reviewed after an event, e.g., after a crime has occurred and been detected by other means, in order to try to identify the responsible individuals. Such an approach is useful for forensic crime detection, but is not well suited for identifying the security breach in real-time and being able to take actions to stop the criminal activity.

In view of the Sep. 11, 2001 terrorist events and other worldwide terrorist activities, the reliability of the above described approaches is unacceptable for many critical sites. There is a need for more reliable surveillance methods and apparatus that remove some of the uncertainty associated with having to count so much on the guard. It would also be beneficial if new methods and apparatus of security surveillance are able to detect security breaches in real-time, so that actions can be taken before damage is done.

In view of the above discussion there is a need for new methods and apparatus of surveillance systems that provide a high level of reliability while maintaining continuous coverage of the surveillance area. It would be beneficial if such systems use approaches that take into account deployment and ongoing costs to provide economically feasible alternatives to currently deployed approaches. Cost effective approaches would be attractive for deployment at other sites where security is needed, but the level of security required is not quite as high, e.g., an office, store, or home site.

In surveillance systems including a larger surveillance area, there is typically a trade-off that needs to be made between resolution and coverage area. One would like to have high resolution cameras everywhere so that objects could be clearly identified and distinguished. Typically, this has required a large number of expensive cameras to cover a small section to obtain enough resolution and a very large number of expensive cameras to cover a large area. This approach can become economically infeasible for many deployments. Typically, system designers have traded-off resolution to satisfy cost budgets, e.g., reducing the number of cameras deployed for a given area or selecting a cheaper camera with lower resolution and/or capabilities. Another problem with a large number of cameras is the issue of bandwidth. Continuous closed circuit television streamed back to a guard site for a large number of cameras, e.g., via dedicated cables or over wireless air links tends to consume a lot of bandwidth, which may not be available or may be very costly. One approach used is to sacrifice resolution or picture quality to increase coverage area, for the same amount of bandwidth. It would be beneficial if methods and apparatus were developed which did not require the system designer to have to make such sacrifices.

Another problem with a surveillance system including a large number of cameras is the reliability issue. As the number of cameras in the system increases, it becomes more likely that at any given time a camera will have failed and be inoperative somewhere in the system, resulting in an uncovered surveillance region. One approach used to address this issue is to deploy for each camera a redundant camera to serve as a back-up. However, this approach becomes very expensive, and is infeasible in many applications from a cost perspective.

In current large scale site deployments, it has been typical for the surveillance system to be custom designed with one set of cameras, camera links, control systems, software packages, etc., being used for one site and a different set of elements being used at another site. Individually designing and integrating such a custom system can be very labor intensive and tends to contribute to system unreliability, as each custom system when deployed has no past track record of operation, and it is to be expected that bugs and deficiencies in the design will show up during operation. In view of the above, it would be beneficial if new methods and apparatus of security systems were developed which tended toward a reusable design approach and a high commonality of hardware/software. Approaches which allowed the basic surveillance system to be readily adapted to different surveillance landscapes and/or sizes without fundamentally altering the system would allow a system design to be tested and qualified, and the qualified system design to be reused in many different deployments with a high level of confidence in reliability.

SUMMARY OF THE INVENTION

The present invention is directed to methods and apparatus of surveillance systems including target detection and tracking functionality. The methods and apparatus of the present invention are suitable for many various surveillance applications and are particularly well-suited to critical surveillance sites which need continuous coverage with a high degree of confidence and a high system reliability. Surveillance methods and systems, in accordance with the present invention, provide a mixture of computerized detection/tracking/confirmation functionality and human recognition, identification, and judgment skills. This approach uses automatic computerized initial detection and/or detection confirmation of targets, followed by alarm indications to the guard interface to alert the guard. The automatic initial target detection provides higher reliability than approaches relying on humans, and the automatic target confirmation reduces false alarms being sent to the guard interface. In addition, by off-loading much of the workload to computerized devices, e.g., the boring and tedious part of the workload, fewer guards are needed and the guards manning the guard interface unit should tend to be more alert and effective in their response to an intruder. In accordance, with the present invention, video output from each of the monitoring cameras is not streamed continuously to the guard station. Video corresponding to an automatically confirmed target detection is forwarded from the pertinent camera to the guard, so that the guard can concentrate on the target and take appropriate actions. By not streaming continuous video from each monitoring camera to the guard station continuously bandwidth is saved.

A surveillance system, in accordance with the present invention, uses a mixture of two different types of smart camera devices. The approach of the present invention provides for wide area continuous surveillance over a designated total surveillance region with a first level of resolution sufficient to detect moving objects and provide an approximate location of a detected target relying primarily upon a set of detection camera devices. The approach of the present invention also provides for a high resolution on demand capability controllable to a subset of designated smaller portions of the entire surveillance region, the designated smaller portions being controllable to include any or nearly any location within the entire surveillance region. The higher resolution imaging is output from tracking camera devices which can zero in on the target, e.g., using pan-tilt-zoom features of the camera, to obtain the high resolution image and facilitate target identification. At different times the high resolution areas will change, e.g., as a tracking camera device is assigned to confirm a detection camera device target or is following and tracking the movements of the target.

The surveillance system includes a first number of detection camera devices and a second number of controllable tracking camera devices, the composite of the detection camera devices providing full coverage of a designated total surveillance area. The second number of tracking camera devices is less than the first number of detection camera devices. In some embodiments, the ratio of detection camera devices to tracking camera devices is at least 4:1. In some embodiments, the ration of detection camera devices to tracking camera devices is at least 10:1. The number of each type of camera device that is employed is typically dictated by the particulars of each individual area undergoing surveillance. In some embodiments, the cameras in the detection camera devices are less expensive, have lower resolution, and/or have lower capabilities than the cameras in the tracking camera devices. This coordinated on-demand target imaging method relieves the need for deploying expensive cameras everywhere. The tracking camera devices are strategically located such that the set of tracking cameras can be controllably positioned and adjusted to view the entirety of the area or substantially the entirety of the area covered by the set of detection camera device. The tracking camera devices typically include pointing direction capability, e.g., rotary and tilt control, and focusing control, e.g., zoom in/zoom out control for changing the focal length.

A detection camera device, including a fixed mounted camera, is used to initially detect a moving target, e.g., intruder, within its coverage area. Target information is collected and/or determined by the detection camera device. Target information, in some embodiments, includes estimated position of the target, e.g., in a universally recognizable 3D coordinate representation such as a GPS coordinate system. A tracking camera device locates the detection camera target, based on the coordinates of the object that it receives, directly or indirectly from the detection camera device. The tracking camera device then continues to track the target object as it moves through the premises. Tracking of a tracking camera device can include redirection of the camera via rotary and tilt mounting control operations and focus adjustment via zoom control. The decision as to which tracking camera should be controlled to respond and perform target verification and target tracking for a detection by a given detection camera device at a given location can be controlled by a centralized control system device or devices.

In accordance with one feature of the invention, the camera devices are smart camera devices. The electronic processing needed to make the detection and/or tracking decisions are embedded into the detection camera devices and tracking camera devices. Various camera devices, in accordance with the present invention include the capability to compress video images and the capability to send the compressed video over an IP network, e.g., using wire, fiber optic and/or wireless communications links. Compressed video from camera devices, when sent, is typically sent to a guard interface unit, the guard interface unit including display and recording capability, as well as alarm indication which can be triggered by an automatically detected an/or confirmed security breach. In some embodiments, some components of the IP network used for communications may not be dedicated to the surveillance system, but may be shared with other users or other systems.

Various embodiments of surveillance systems in accordance with the present invention include a centralized control system including redundant capabilities. In some embodiments two centralized control systems are used, with each centralized control system being defaulted to be responsible for handing control operations of a fraction of the total number of camera devices in the surveillance system thus normally dividing the control system load. In such an embodiment, should one of the centralized control systems be determined to have failed, then the other centralized control system can be controlled to take over management of the camera devices normally handled by the failed unit, thus allowing normal surveillance operations to continue. In another feature of some embodiments of the present invention, each of the camera devices votes on the good/bad status of the control system devices, and a tally of the votes is used in the determination as to whether or not a centralized control system has failed and should be taken off-line.

In accordance, with another feature of some embodiments, of the present invention, the control system is able to maintain full or nearly full detection coverage should one of the detection camera devices fail. By temporarily reassigning one tracking camera device, or more than one tracking camera device used in combination, to be positioned and focus set to cover the same area that would normally be covered by the failed detection camera device, overall coverage is maintained. In such a situation, the reassigned tracking camera device would not be used for target confirmation and would not be controlled to zoom in on and follow a target, but would rather temporarily serve to provide initial target detection and locate the target based on target position within a fixed field of view. Under such a scenario, the centralized control system units would change the criteria for sending an alert and sending compressed video to the guard interface unit for such a coverage region so that a single camera detection would result in an alarm and the forwarding of video. This approach, in accordance with the present invention, provides a graceful degradation of overall capabilities in a limited region, while yet maintaining full or nearly full coverage for the entire surveillance area.

In some embodiments, the centralized control systems, include a camera to camera tracking module for coordinating handoffs as targets move between coverage areas of different cameras and for identifying that a target which shows up on more than one camera device, e.g., at a boundary region, is actually the same target. In various embodiments, the centralized control system includes a multi-camera target position triangulation module which use information from a plurality of camera devices to obtain a triangulation based location fix of the target, which may be more precise than target location information obtained from a single camera device.

In some embodiments, the camera devices add additional information to the video communicated to the guard interface unit, e.g., a box surrounding the target, date/time tag information, camera device ID information, and/or GPS target location information.

Target size is an important parameter for target discrimination. In some embodiments, the camera devices can determine target size based on a 3 dimensional model. This approach of using a 3D model is advantageous because the terrain in a large surveillance area can be very uneven. In some embodiments, the surveillance system automatically constructs the 3D model as part of a built in functionality during system installation which simplifies calibration complexity.

Another feature of some embodiments of the present invention is the use of a portable coordinate system, e.g., a GPS coordinate system. Each of the elements in the system, as well as guards investigating a target detection, can interchange data/information associated with the same target and the data/information can be processed, e.g., obtaining a more precise position fix using data/information from multiple cameras, e.g., using triangulation techniques. By providing geo-spatial information that can be visualized on a sitemap and associated with universally recognizable GPS coordinates, an investigating guard can be quickly and efficiently directed to the target.

In some embodiments, the surveillance system includes a mobile node, e.g., cell phone device, personal data assistant (PDA), etc., optionally including a GPS receiver module. The mobile node can be carried by an investigating guard or a guard on patrol, in communications with the guard interface unit, and the guard can be directed to the intruder target.

DETAILED DESCRIPTION

Figure 1:
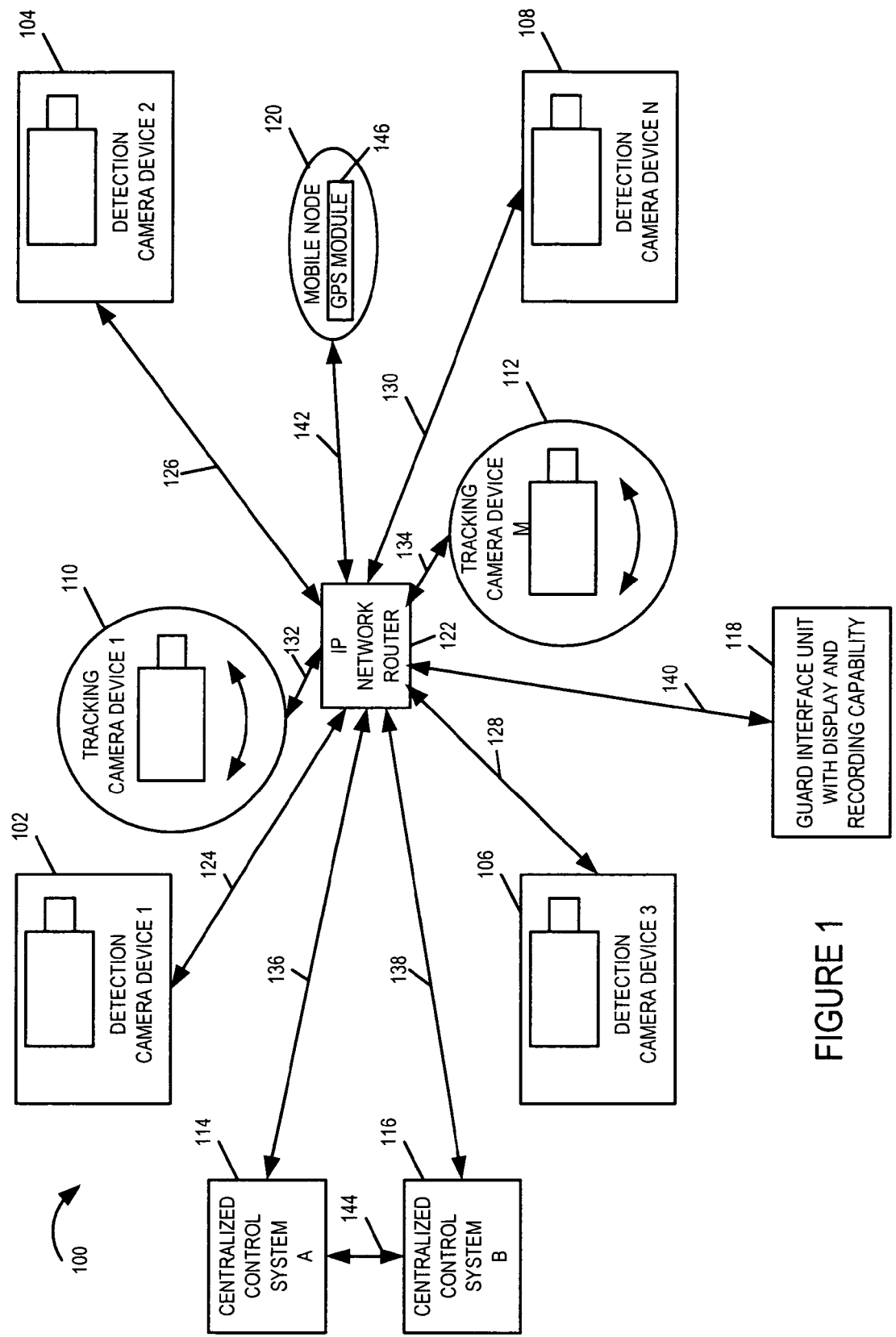
FIG. 1 is a drawing of an exemplary surveillance system implemented in accordance with the present invention and using methods of the present invention.

FIG. 1 is a drawing of an exemplary automated threat detection and tracking system 100 implemented in accordance with the present invention and using methods of the present invention. Exemplary system 100 includes a plurality of detection camera devices (detection camera device 1 102, detection camera device 2 104, detection camera device 3 106, detection camera device N 108), a plurality of tracking camera devices (tracking camera device 1 110, tracking camera device M 112), two centralized control systems (centralized control system A 114, centralized control system B 116), a guard interface unit 118, a mobile node 120, and an IP network router 122. The various devices (102, 104, 106, 108, 110, 112, 114, 116, 118, 120) are coupled to IP network router 122 via communication links (124, 126, 128, 130, 132, 134, 136, 138, 140, 142), respectively, allowing the various devices to communicate with one another and interchange data/information.

Exemplary system 100 is an integrated system which utilizes two distinct types of smart camera devices (detection and tracking) to provide intruder detection and/or identification. Each smart camera device (102, 104, 106, 108, 110, 112) includes embedded electronic processing capability to make detection and/or tracking decisions regarding intruder targeting. Exemplary system 100 includes a fewer number of tracking camera devices (110, 112) than the number of detection camera devices (102, 104, 106, 108). In some embodiments the ratio of detection camera devices to tracking camera devices is 4 to 1 or larger. In some embodiments the ratio of detection camera devices to tracking camera devices is 10 to 1 or larger. The specific number of each type camera device that is employed will generally be dictated by the particulars of each area undergoing surveillance, e.g., different terrains and obstacles dictating different camera number requirements and/or positioning arrangements. Exemplary system 100 is well suited for use at facilities or locations with a requirement to monitor a specified surveillance area such as a perimeter and provide visualization of any unauthorized intrusion, e.g., airports, banks, government buildings, country borders, military facilities, temporary military bases, secured areas, nuclear power plants, critical infrastructure such as bridges, tunnels, dams, and/or reservoirs, prisons, home or business sites, etc.

The set of deployed detection camera devices (102, 104, 106, 108), each including a fixed position mounted camera, used in combination provides complete or nearly complete continuous coverage of the designated surveillance area. The detection camera devices (102, 104, 106, 108) will typically be distributed in such a manner that every portion or nearly every portion of the designated surveillance area is monitored by at least one of the detection camera devices (102, 104, 106, 108). The tracking camera devices (110, 112), each including a camera which can be panned and/or tilted, can be operated to redirect its surveillance area view. In some embodiments, the cameras in the tracking camera devices (110, 112) are the same as the cameras used in the detection camera devices (102, 104, 106, 108). In some embodiments, the cameras in the tracking camera devices (110, 112) also include a zoom capability not available in the cameras in detection camera devices (102, 104, 106, 108). In some embodiments, the detection camera devices (102, 104, 106, 108) are typically operated to cover a large field of view with low resolution while the tracking camera devices (110, 112) are operated to cover a narrow field of view with higher resolution. In some embodiments, the cameras used in tracking camera devices (110, 112) are more complex and/or expensive than the cameras used in detection camera devices (102, 104, 106, 108).

Detection camera devices (102, 104, 106, 108) detect suspicious motion within its field of view. Typically, one tracking camera (110, 112) is situated so that it can be directed to view at least some portions of the areas covered by each of more than one detection camera device. Tracking camera devices (110, 112) are operated in coordination with the detection camera devices (102, 104, 106, 108) to respond to a detection camera target detection and zero in on the target, e.g., to confirm the detection and/or to obtain a higher resolution image of the detected target. This coordinated on-demand target imaging method eliminates the need of deploying as many tracking cameras, e.g., expensive tracking cameras, as target cameras in the system 100. In some embodiments, tracking camera devices (110, 112), when not being directed to track a target based on a detection camera device (102, 104, 106, 108) detection, are operated to sweep its coverage area, e.g., in a repetitive fashion, with the camera acting as an additional detection device for the system.

A detection camera device (102, 104, 106, 108) is used to initially detect an intruder or other object on the premises under surveillance and obtain target information including target location coordinates. The target location coordinates are forwarded, either directly or indirectly to a targeting camera device (110, 112) which has the ability to view the target location. Typically different targeting camera devices (110, 112) are associated with different detection camera devices (102, 104, 106, 108). The targeting camera device (110, 112), responding to the received target coordinates, locates the target object based on the received coordinates. The tracking camera device (110, 112) continues to track the target as it moves throughout the premises within its coverage area, e.g., with the tracking camera being position controlled to follow the target. Position control may include pan, tilt, and/or zoom settings of the tracking camera device associated with a three dimensional target location. The location of the target is also simultaneously tracked within the detection camera's field of view by the detection camera, e.g., generally with less resolution than achieved with the tracking camera, as the detection camera cannot be repositioned to follow the targets movements. Controlled target tracking handoff operations may be performed, e.g., between tracking camera device 1 110 and tracking camera device M 112, as a target moves from one coverage area to another so that the target tracking is maintained uninterrupted.

Centralized control system A 114 and centralized control system B 116 are controllers for the detection camera devices (102, 104, 106, 108) and tracking camera devices (110, 112) communicating through the IP network router 122, and coordinating overall control in system 100. For example, centralized control system A 114 may be defaulted to control detection camera devices (102, 104) and tracking camera device (110), while control system B 116 may be defaulted to control detection camera devices (106, 108) and tracking camera device (112). Communications between centralized control systems (114, 116) and camera devices (102, 104, 106, 108, 110, 112) include authentication, control commands, camera orientation and/or coordinates, target information, status information, error information, and/or reconfiguration information.

Compressed video images can be sent over the network from the camera devices (102, 104, 106, 108, 110, 112) on demand, triggered by a breached event, and/or triggered by a confirmed breach event. In some embodiments, video images need not be, and generally are not, sent to the centralized control systems (114, 116), but are rather sent to the guard interface unit 118. In order to conserve communications bandwidth in the IP network, video image data is typically not sent continuously from each camera to the guard interface unit, but rather is selectively sent, e.g., due to a detected breach.

The guard interface unit 118 includes display and recording capability. Typically detected breach events and/or centralized control system confirmed breach events, e.g., multiple camera target detection, trigger alarm indications at the guard interface unit 118 and direct video images from the camera which detected and/or tracked the target to video displays without the need for operator intervention. In addition, automated recording of detected breach event video is, in some embodiments performed without the need for operator intervention.

Exemplary system 100 also includes robust fault management. Typically each centralized control system (114, 116) manages a portion of the camera devices (102, 104, 106, 108, 110, 112) in system 100, e.g., balancing the load. However, if one centralized control system, e.g., system A 114, should fail, the other centralized control system, e.g., system B 116, can take over the management responsibilities of the failed unit, assuming full management control and allowing monitoring, detection, and tracking operations to continue uninterrupted. The single centralized control system, e.g. system B 116, can maintain full control unit the defective unit, e.g., system A 114, has been repaired or replaced.

In some embodiments, one of the centralized control systems, designated the primary unit, is defaulted to maintain overall management of each of the camera devices, and the other centralized control system is maintained as a back-up or redundant unit. Control is switched to the redundant unit if it is determined that the primary unit has failed. In some embodiments, more than two centralized control systems are deployed with the camera management load being distributed among the plurality of centralized control systems. In some embodiments, with more that two centralized control systems, some of the centralized control systems are designated as primary units, defaulted to manage camera devices and other centralized control systems, and some of the centralized control systems are designated redundant units, held in reserve to take over operations of a unit which fails.

In accordance with another feature of the present invention, each camera device (102, 104, 106, 108, 110, 112) can vote on the operational status of the centralized control systems (114, 116). A decision as to whether to categorize a centralized control system as failed and take it off line is made as a function of the tallied camera votes, self-test operations within the centralized control system, and/or test checks performed by the other centralized control system. Centralized control system A 114 is coupled to centralized control system B 116 via link 144, e.g., a dedicated bus providing each system (114, 116) with the capability to test and/or monitor at least some of the internal operations of the other unit. In some embodiments, link 144 conveys at least two of a heartbeat signal, a watchdog timer signal, built-in-test equipment (BITE) signal, and a status message. In some embodiments, a first private link between CCS A and CCS B conveys CCS A's heartbeat signal to CCS B, where the signal is monitored, and a second private link between CCS B and CCS A conveys CCS B's heartbeat signal to CCS A where it is monitored.

In accordance with another feature of the present invention, the fault of a single camera does not significantly affect the overall total monitoring and detection capability of the system 100. The system 100 is gracefully reconfigured to temporarily provide a slightly lower level of overall automated tracking, until the failed camera device can be repaired and/or replaced.

If a single, detection camera device, e.g., detection camera device 102, is detected to have failed, e.g., either from a self-test determination of the camera device, or from a determination by a centralized control system (114, 116), the area of coverage corresponding to the faulted detection camera is replaced by one or more tracking camera devices (110, 112). In such a situation, the one or more tracking camera devices (110, 112) are controlled by the centralized control system (114, 116) to be re-configured into a monitoring camera mode of operation, e.g., setting the tracking camera device (110, 112) to a fixed orientation and zoom setting such that the surveillance area of the faulted detection camera device will be replaced by the coverage area of the one or more tracking camera devices on a continuous surveillance basis. When the faulted monitoring camera device is repaired or replaced, the tracking camera device (110, 112) can be reconfigured back into a tracking mode of operation.

If one or more tracking camera devices (110, 112) should fail, monitoring and detection capability is still maintained at a full coverage level by the set of functional tracking monitoring camera devices (102, 104, 106, 108).

Temporarily, while a tracking camera device is unavailable to perform typical tracking camera functions such as providing: a high resolution target image, target confirmation, and/or target camera following, e.g., due to reassignment as a detection camera or due to a fault in a tracking camera device, the system will still provide a high level of detection confidence as an intruder will still be automatically detected, and can be tracked by the detection camera coverage, albeit with slightly less resolution.

In addition, when a camera device is taken off line the guard interface unit 118 will be notified so that the failed unit can be promptly replaced or repaired, and the guards will be attentive to concentrate additional resources to the monitoring areas with single camera coverage, e.g., manually commanding a video feed from such areas of single camera coverage. In embodiments, in which target confirmation is typically obtained from two cameras before notifying the guard interface unit of an intruder and/or sending video to the guard interface unit 118, the target confirmation requirements are automatically adjusted as a function of the regions where multiple camera coverage is not currently available, e.g., allowing a single monitored target detection in such a region to result in a guard notification and the automatic transmission of video to the guard interface unit 118. Thus, when a first type camera fails, a detection event by the second type camera used to take over for the first type camera may, and often does, result in a detection signal being sent to a guard interface unit from the control system without first requiring a confirmation detection by a second camera of the detection event by the second camera which took over for the failed first type camera.

Mobile node 120, e.g., a cellular communication device such as a cell phone, personal data assistant (PDA), walkie-talkie, etc., including or in combination with a Global Position Module 146, e.g., a GPS receiver, antenna and location indication device, is carried by a guard in communications with the guard interface unit 118. The guard interface unit 118 can direct the guard to the detected target, e.g., intruder, via GPS target coordinates and/or in conjunction with a map.

IP network router 122 may include landline network routers and/or wireless network routers, e.g., a base station and a cell antenna. Various combinations between landline and/or wireless communications links (124, 126, 128, 130, 132, 134, 136, 138, 140, 142) are possible in accordance with various embodiments of the present invention. For example in some embodiments, the entire system may use wireless communications, e.g., WI-FI, while in other embodiments, the entire system may use landline communications, e.g., a broadband cable network using coaxial cabling and/or fiber optic links. In still other embodiments, a mixture between wired/wireless communications is deployed. For example, the centralized control systems (114, 116) can be linked to the guard interface unit via landline links; some camera device (102, 104, 106, 108, 110, 112), e.g., those mounted at or near the building structures, can be linked to the IP network via landline links; some camera devices (102, 104, 106, 108, 110, 112), e.g., those located at remote sites, can be linked to the IP network via wireless links, and mobile node 120 is linked to the IP network via a wireless link 142.

Figure 2:
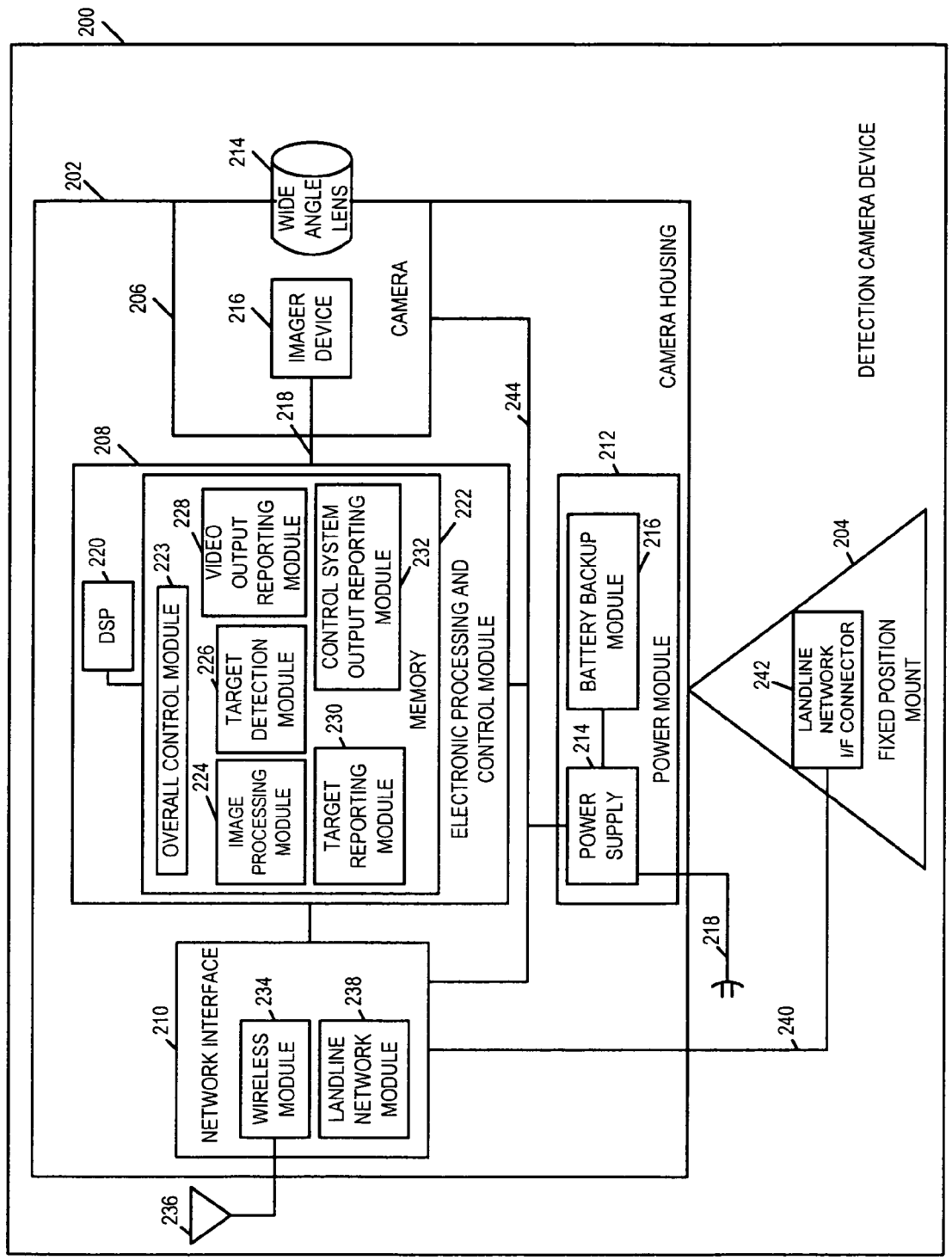
FIG. 2 is a drawing of an exemplary detection camera device implemented in accordance with the present invention and using methods of the present invention.

FIG. 2 is a drawing of an exemplary detection camera device 200 implemented in accordance with the present invention and using methods of the present invention. Exemplary detection camera device 200 may be any of the detection camera devices (102, 104, 106, 108) of the exemplary system 100 of FIG. 1. Exemplary detection camera device 200 includes a camera housing 202 and a fixed position mount 204. The fixed position mount 204 allows the camera housing 202 to be oriented to a selected rotary azimuth direction setting and tilt angle with respect to the horizontal plane and secured. In some embodiments, the fixed position mount 204 also includes a vertical adjustment, e.g., a retracting pole, which can be used to set the height to a selected altitude, and then secure the setting. The settings of the fixed position mount 204 are selected to obtain a selected field of view for detection corresponding to the camera's surveillance coverage area.

The camera housing 202 includes a camera 206, an electronic processing and control module 208, a network interface 210, and a power module 212. The camera 206, e.g., a visible spectrum camera, includes a wide angle lens 214 and an imager device 216. The wide angle lens 214 may be set for a fixed focal point. The imager device 216 may be, e.g., a charge coupled device (CCD) array and corresponding control and interface electronics. The imager device 216 receives a light image and converts the image into an electrical signal representation. The output signal 218 from the imager device 216 is forwarded to the electronic signal and processing control module 208.

The electronic processing and control module 208 includes a digital signal processor (DSP) 220 and memory 222. The DSP 220 executes routines and uses data/info in memory 222 to control the operation of the detection camera device 200 and implement the methods of the present invention. The memory 222 includes an overall control module 223, an image processing module 224, a target detection module 226, a video output reporting module 228, a target reporting module 230, and a control system output reporting module 232. The overall control module 223 controls the main operation and directs operational flow control of the detection camera device 200. The image processing module 224 processes received signals 218, e.g., filtering and stabilizing the received signal. Target detection module 226 identifies targets, e.g., moving objects within its field of view and collects data corresponding to the target. Target reporting module 230 generates and outputs target information, e.g., GPS target coordinates, to the centralized control system (114, 116). Video output reporting module 228 generates and outputs compressed video images to the guard interface unit, e.g., following the detection of a target. Control system output reporting module 232 generates and outputs fault indication signals and/or status indication signals pertaining to the detection camera device 200 and centralized control system devices (114, 116), e.g., a pass/fail vote on the condition of a control unit.

Network interface 210 includes a wireless interface module 234 coupled to an antenna 236, and a landline network module 238. Some detection camera devices 200 may include one of a wireless module 234 and a landline network module 238, e.g., as suitable for the environment. For example, a detection camera device located at a remote site in a field may include a wireless module 234 but not a landline network module 238, while a detection camera device located on a building may include a landline network module 238, but not a wireless module. The wireless interface module 234 includes a wireless transmitter, a wireless receiver, and a communications module implementing communications protocols. Wireless module 234 is used to communicate with other system 100 elements though a wireless router. The landline network module 238 is coupled via link 240 to a landline network interface connector 240 which may be secured to the fixed position mount 204 or secured to the camera housing 202. The landline network module 238 includes line receivers and drivers, line protection devices, and a communication module implementing communications protocols. The landline network module 238 is used to communicate with other system 100 elements via a landline network router.

Power module 212 includes power supply 214 and battery back-up module 216. The power supply 214 is attached to an input power line plug/cord 218 for receiving external input power, e.g., 120 VAC 60 Hz. In some embodiments, the power supply can be configured to accept more than one different external power sources. Some examples of exemplary input voltage sources may include: 24 VAC 60 Hz, 120 VAC 60 Hz, 100 VAC 60 Hz, 220 VAC 60 Hz, 100 VAC 60 Hz, 100 VAC 50 Hz, 220 VAC 50 Hz, 380 VAC 50 Hz, 400 VAC 50 Hz, 120 VAC 400 Hz, 12 VDC, 24 VDC, 28 VDC, etc. Power supply 214, converts the input power source voltage to a number of voltage supplies used by the detection camera device, e.g., +5 VDC, +/−15 VDC, etc. The output voltages of the power supply 214 are routed via power and grounding bus 244 to the various elements: camera 206, electronic processing and control module 208, and network interface 210. Battery back-up module 216 includes a battery, primary power source detection circuitry, battery charging circuitry, and a battery status monitor. The battery back-up module 216 allows the detection camera device 200 to operate if the primary power source is unavailable, lost, or severed. The battery back-up module 216 can detect loss of primary power and transfer to use the back-up battery. In addition, the battery back-up module 216 charges the battery while using primary power. The battery back-up module 216 can report back to the centralized control system (114, 116) and/or guard interface unit 118, low battery level. In some embodiments, e.g., where the detection camera device 200 is situated at a remote site such as in a field battery back-up module can function as the primary power source, e.g., with the battery being replaced and/or recharged as needed.

Figure 3:
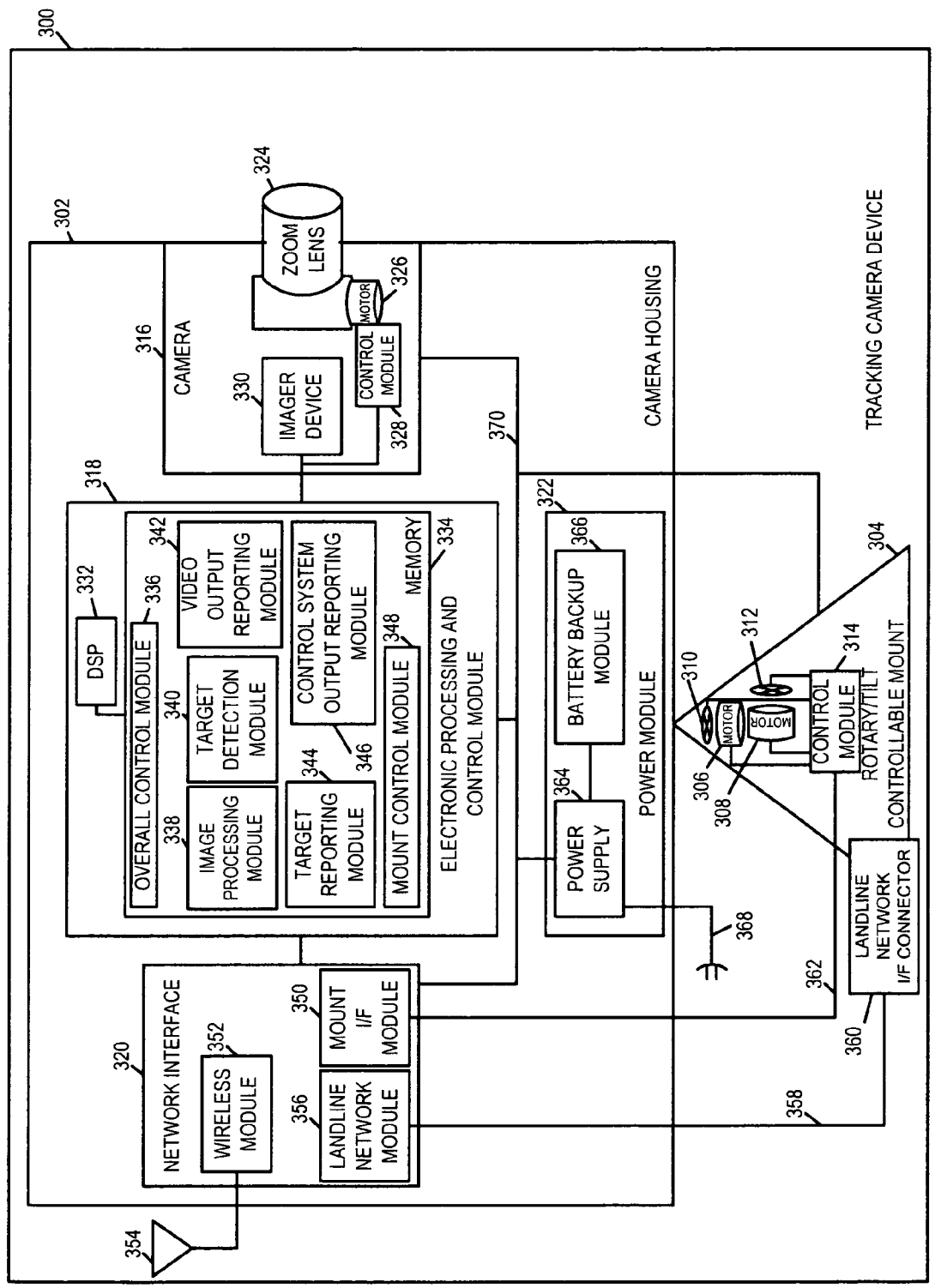
FIG. 3 is a drawing of an exemplary tracking camera device implemented in accordance with the present invention and using methods of the present invention.

FIG. 3 is a drawing of an exemplary tracking camera device 300 implemented in accordance with the present invention and using methods of the present invention. Exemplary tracking camera device 300 may be any of the tracking camera devices (110, 112) of the exemplary system 100 of FIG. 1. Exemplary tracking camera device 300 includes a camera housing 302 and a rotary/tilt controllable position mount 304. The rotary/tilt controllable position mount 304 allows the camera housing 302 to be oriented to a selected rotary azimuth direction setting and tilt angle with respect to the horizontal plane as a function of received signals. The rotary/tilt controllable mount 304 includes a rotary positioning motor 306, a tilt positioning motor 308, a rotary position encoding sensor 310, a tilt position encoding sensor 310. The various elements (306, 308, 310, 312) are coupled to the control module 314, which responds to received position commands to move the camera housing. In some embodiments, the controllable position mount 304 also includes a vertical adjustment, e.g., a powerized retracting pole, which can be controllably extended to set the height to a selected altitude. The settings of the controllable mount 304 are selected to obtain a selected field of view for detection corresponding to the camera's directed coverage area, e.g., a designated target area based on GPS target coordinates from a detection camera device 200 which detected a target.

The camera housing 302 includes a camera 316, an electronic processing and control module 318, a network interface 320, and a power module 322. The camera 306, e.g., a visible spectrum camera and/or an infra-red camera, includes a controllable zoom angle lens 324 coupled to a motor 326 coupled to a control module 328. The control module 328 controls the motor 326 to move the zoom lens 324 to the desired setting based on received command signals. The zoom lens 324 may be set adjusted to achieve different focal points. Camera 316 also includes an imager device 333. The imager device 330 may be, e.g., a charge coupled device (CCD) array and/or IR sensing device and corresponding control and interface electronics. The imager device 330 receives a light image and converts the image into a electrical signal representation. The output signal from the imager device 330 is forwarded to the electronic signal and processing control module 318.

The electronic processing and control module 318 includes a digital signal processor (DSP) 332 and memory 334. The DSP 332 executes routines and uses data/info in memory 334 to control the operation of the tracking camera device 300 and implement the methods of the present invention. The memory 334 includes an overall control module 336, an image processing module 338, a target detection module 340, a video output reporting module 342, a target reporting module 344, a control system output reporting module 346, and a mount control module 348. The overall control module 336 controls the main operation and directs operational flow control of the tracking camera device 300. The overall control module 336 also controls whether the tracking camera device is functioning in its primary role as a tracking camera or is functioning in its back-up role as a temporary replacement detection camera. The image processing module 338 processes received signals, e.g., filtering and stabilizing the received signal. Target detection module 340, receives target coordinates, determines camera position control settings to capture the target in its field of view, identifies targets, e.g., moving objects within its field of view, controls zoom in on detected targets, collects data corresponding to the target, and continues to track the target as it moves, e.g., determining camera mount settings to reposition the camera to keep the camera directed at the target as it moves. Target reporting module 344 generates and outputs target information, e.g., GPS target coordinates, to the centralized control system (114, 116). Video output reporting module 342 generates and outputs compressed video images to the guard interface unit, e.g., following the detection of a target. Control system output reporting module 346 generates and output fault indication signals and/or status indication signals pertaining to the tracking camera device 300 and centralized control system devices (114, 116), e.g., a pass/fail vote on the condition of a control unit. Mount control module 348 receives information from the target detection module 340, e.g., desired camera position settings, generates commands in a format acceptable to the mount control module 314, and sends the commands via mount interface 350 of network interface 320.

Network interface 320 includes a wireless interface module 352 coupled to an antenna 354, a landline network module 356, and the mount I/F module 350. Some tracking camera devices 300 may include one of a wireless module 352 and a landline network module 356, e.g., as suitable for the environment. For example, a tracking camera device located at a remote site in a field may include a wireless module 352 but not a landline network module 356, while a detection camera device located on a building may include a landline network module 356, but not a wireless module 352. The wireless interface module 352 includes a wireless transmitter, a wireless receiver, and a communications module implementing communications protocols. Wireless module 352 is used to communicate with other system 100 elements though a wireless router. The landline network module 356 is coupled via link 358 to a landline network interface connector 360 which may be secured to the position mount 304 or secured to the camera housing 302. The landline network module 356 includes line receivers and drivers, line protection devices, and a communication module implementing communications protocols. The landline network module 356 is used to communicate with other system 100 elements via a landline network router. The Mount I/F Module 350 is coupled to control module 314 via link 362. Mount I/F module 350 may include, e.g., a standard serial or parallel interface, e.g., an IEEEE standard interface, RS232, RS422, RS485, USB, firewire, etc., or a custom interface. Link 362 may include cabling and mating connectors, e.g., including one connector mounted on the exterior of the camera housing 302 and one connector mounted on the controllable mount 304.

Power module 322 includes power supply 364 and battery back-up module 366. The power supply 364 is attached to an input power line plug/cord 368 for receiving external input power, e.g., 120VAC 60 Hz. In some embodiments, the power supply can be configured to accept more than one different external power sources. Some examples of exemplary input voltage sources may include: 120 VAC 60 Hz, 100VAC 60 Hz, 220VAC 60 Hz, 100VAC 60 Hz, 100VAC 50 Hz, 220VAC 50 Hz, 380VAC 50 Hz, 400VAC 50 Hz, 120VAC 400 Hz, 12VDC, 24VDC, 28VDC, etc. Power supply 364, converts the input power source voltage to a number of voltage supplies used by the detection camera device, e.g., +5VDC, +/−15VDC, etc. The output voltages of the power supply 364 are routed via power and grounding bus 370 to the various elements: camera 316, electronic processing and control module 318, network interface 320, and controllable mount 304. Battery back-up module 366 includes a battery, primary power source detection circuitry, battery charging circuitry, and a battery status monitor. The battery back-up module 366 allows the tracking camera device 300 to operate if the primary power source is unavailable, lost, or severed. The battery back-up module 366 can detect loss of primary power and transfer to use the back-up battery. In addition, the battery back-up module 366 charges the battery while using primary power. The battery back-up module 366 can report back to the centralized control system (114, 116) and/or guard interface unit 118, low battery level. In some embodiments, e.g., where the tracking camera device 300 is situated at a remote site such as in a field battery back-up module can function as the primary power source, e.g., with the battery being replaced and/or recharged as needed.

Figure 4:
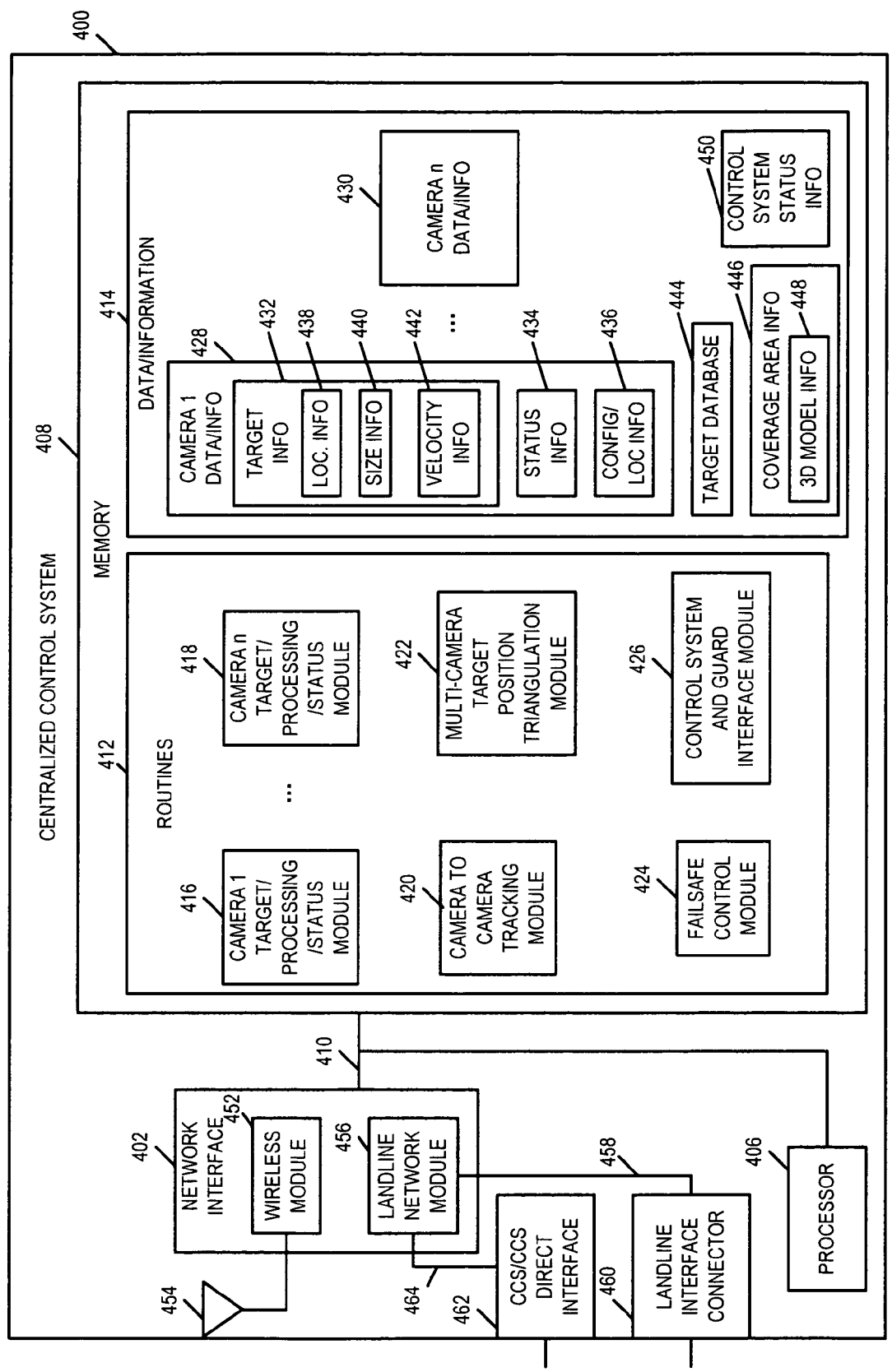
FIG. 4 is a drawing of an exemplary centralized control system implemented in accordance with and using methods of the present invention.

FIG. 4 is a drawing of an exemplary centralized control system (CCS) 400 implemented in accordance with and using methods of the present invention. Centralized control system 400 may be any of the centralized control systems (114, 116) of system 100 of FIG. 1. Centralized control system 400 includes a network interface 402, a processor 406, and memory 408 coupled together via a bus 410 over which the various elements may interchange data and information. Memory 408 includes routines 412 and data/information 414. The processor 406, e.g., a CPU, executes the routines 412 and uses the data/information 414 in memory 408 to operate the centralized control system 400 and implement the methods of the present invention.

Routines 412 include a plurality of camera target/processing/status modules (camera 1 target/processing/status module 416, camera n target/processing/status module 418), e.g., one module for each camera monitoring or tracking device in the system. Routines 412 also include a camera to camera tracking module 420, a multi-camera target position triangulation module 422, a failsafe control module 424, and a control system and guard interface module 426.

Data/information 414 includes a plurality of sets of camera data/information (camera 1 data/info 428, camera n data info 430) corresponding to the plurality of camera target processing/status modules (416, 418), respectively. Data/info 414 also includes target database information 444, coverage area information 446, and control system status information 450.

Camera 1 data/info 428 includes target information 432, status information 434, and configuration/location information 436. Camera 1 target/processing/status module 416 controls the input, output, and processing related to camera 1 data/info 428. Similarly, camera n target/processing/status module 418 controls the input, output, and processing related to camera n data/info 430.

Target information 432 includes location information 438, size information 440, and velocity information 442. Location information 438 includes information identifying the location of a target. For example, if camera 1 corresponds to a detection camera device, then the location information may include the location of a target detected by camera 1; if camera 1 corresponds to a tracking camera device, the location information may include a location fix corresponding to a detection camera fix to be used as input to the tracking camera and/or a location fix determined by camera 1 of the target, e.g., a more precise location fix. Location information 438 in some embodiments is represented in a GPS coordinate system, e.g., WGS-84 (World Geodetic System-1984) including latitude, longitude, and altitude. In some embodiments, location information 438 is represented in a grid mapping index, e.g., a custom grid and or a standard representation, e.g., UTM (Universal Transverse Mercator) system plus optionally altitude information. Location information 438 in some embodiments includes three dimensional position fix information. Size information 440 includes target size approximation information, target size classification information, and, in some embodiments, includes 3D target size information. Velocity information 442 includes information used to derive a target velocity and/or a determined target velocity. Velocity information 442 includes information which may be received by the camera, may be forwarded from the camera, and/or may be determined by module 416. For example a target velocity can be determined by module 416 based on a number of successive location fixes, e.g., time-stamped position fixes. The determined target velocity can be forwarded from the camera device. Alternative, or in addition, information that can be used to derive velocity, e.g., time-stamped position fixes can be forwarded, e.g., to a CCS or a guard interface unit which can determine the target velocity. In some embodiments, target heading information is also received from a camera or determined by module 416 based on received target information. Multiple sets of target information 432 may exist for camera 1, e.g., corresponding to multiple targets within the field of view of the camera.

Status information 434 includes information identifying the operational status of camera 1, e.g., camera device operating normally/camera device failed. In some embodiments, cameras may also be classified and identified in terms of degraded levels of operation, e.g., weak signal output, calibration levels exceeded, etc. Status information 434 may also include information identifying faults, conditions, and/or problems in the camera device, e.g., zoom non-functional, power supply fail, battery low, controllable mount problem, weak or no received signal, failed self-test, etc. Status information 434 also includes information identifying the mode of operation of the camera device. For example, some exemplary modes for a tracking camera device may include: a standby mode waiting for a detection camera to send a target location fix, a scanning mode to perform additional supplementary detection operations while waiting for a detected target position fix, a confirm detect/track/follow target mode in response to a received target fix from a detection camera, a back-up detection camera mode replacing a failed detection camera device, and a power off mode following a detected failure of the tracking camera device. Status information may also include camera 1 determined status regarding each CCS 400, e.g., a camera 1 vote on the CCS as good/bad.

Configuration/location information 436 includes information identifying which CCS 400 has been assigned to camera 1 as its default controller, which CCS 400 has been assigned as its default controller, and which CCS 400 camera 1 is currently using for primary communications. Configuration/location information 436 includes, the location of camera 1, e.g., in GPS coordinates, within the system. Location information 436 can also include camera field of view information, camera pointing direction, e.g., in terms of angles of rotary and tilt due to mounting and/or due to controlled camera motion. Configuration information 436 can include camera 1 model information, type information, settings, zoom value, focal point, etc.

Target database 444 includes a composite of target information from multiple camera devices. Target database information 444 includes information identifying targets being tracked by multiple cameras as being the same target.

Coverage area information 446 includes information identifying the overall surveillance area, information identifying surveillance areas associated with specific cameras, and information identifying which tracking camera devices should be used and how they should be directed, e.g., rotary, tilt, zoom setting, when directed to act in a detection camera mode to replace a failed detection camera. Coverage area information 446 also includes information identifying which tracking camera device should be notified, sent target coordinates, and commanded to confirm target and track target when a given detection camera detects a target at a specific location. Coverage area 446 also includes a 3D model representation of the surveillance area 448.

Control system status information 450 includes information on the status of each of the CCSs 400, e.g., operating normally and on-line, fault detected and off-line, etc. Control system status information 450 includes information obtained from the cameras, e.g., pass/fail votes on operational status of a CCS, tabulated votes, CCS self-test information, and information obtained from or obtained on the other CCS.

Camera to camera tracking module 420 performs control operations such that target tracking handoff operations are smoothly performed from one camera to another as a target moves from the surveillance area of one camera to another. In addition, the camera to camera tracking module 420 performs operations to identify and classify a target being tracked by multiple camera, e.g., in overlapping regions as the same target.

Multi-camera target position triangulation module 422 uses camera detection target information, e.g., GPS target fixes, camera orientation and setting information, and known camera position location and mounting information, from multiple cameras observing the same target to triangulate the target position and obtain a triangulated position fix, which is generally a more precise position fix than any single camera could obtain on its own.

Fail safe control module 424 performs operations related to fault management and graceful system reconfiguration. For example, the fail safe control module 424 may decide that a detection camera device has failed and reassign an appropriate tracking camera device or devices to be used in a detection mode of operation to temporarily take over the coverage range of the faulted detection camera device. Fail safe control module 424 also process signals and perform operations used to determine whether a CCS has failed, e.g., tallying camera votes, performing self-tests, performing tests of the other CCS. Fail safe module 424 also implements a controlled transfer of camera device control from one CCS to another in the event of a determined CCS failure.

Control system and guard interface module 426 performs notifications to the guard interface unit 118 when a detected target has been confirmed, e.g., by a tracking camera device, e.g., forwarding target information such as target location and/or identifying which camera feeds should be requested and/or viewed to observe the target. In some embodiments, the CCS 400 may, following a confirmation, signal the appropriate cameras to forward information to the guard interface unit 118. This confirmation process, when so implemented, can help prevent false alarms. Control system and guard interface module 426 also notifies the guard interface unit 118 of equipment failures such that the guard may take appropriate action to repair/replace the failed device and to recognize that additional resources may need to be concentrated on a area in the system.

Network interface 402 includes a wireless interface module 452 coupled to an antenna 454, and a landline network module 456. The wireless interface module 452 includes a wireless transmitter, a wireless receiver, and a communications module implementing communications protocols. Wireless module 452 is used to communicate with other system 100 elements though a wireless router. The landline network module 456 is coupled via link 458 to a landline network interface connector 460, e.g., a coaxial cable connector or a fiber optic cable connector. The landline network module 456 includes line receivers and drivers, line protection devices, and a communication module implementing communications protocols. The landline network module 456 is used to communicate with other system 100 elements via a landline network router. Landline connector module 456 is also coupled to a CCS/CCS direct interface 462, e.g., a dedicated interface allowing each CCS to monitor at least some of operations of the other CCS to help in the determination of the status of a CCS, via link 464.

Figure 5:
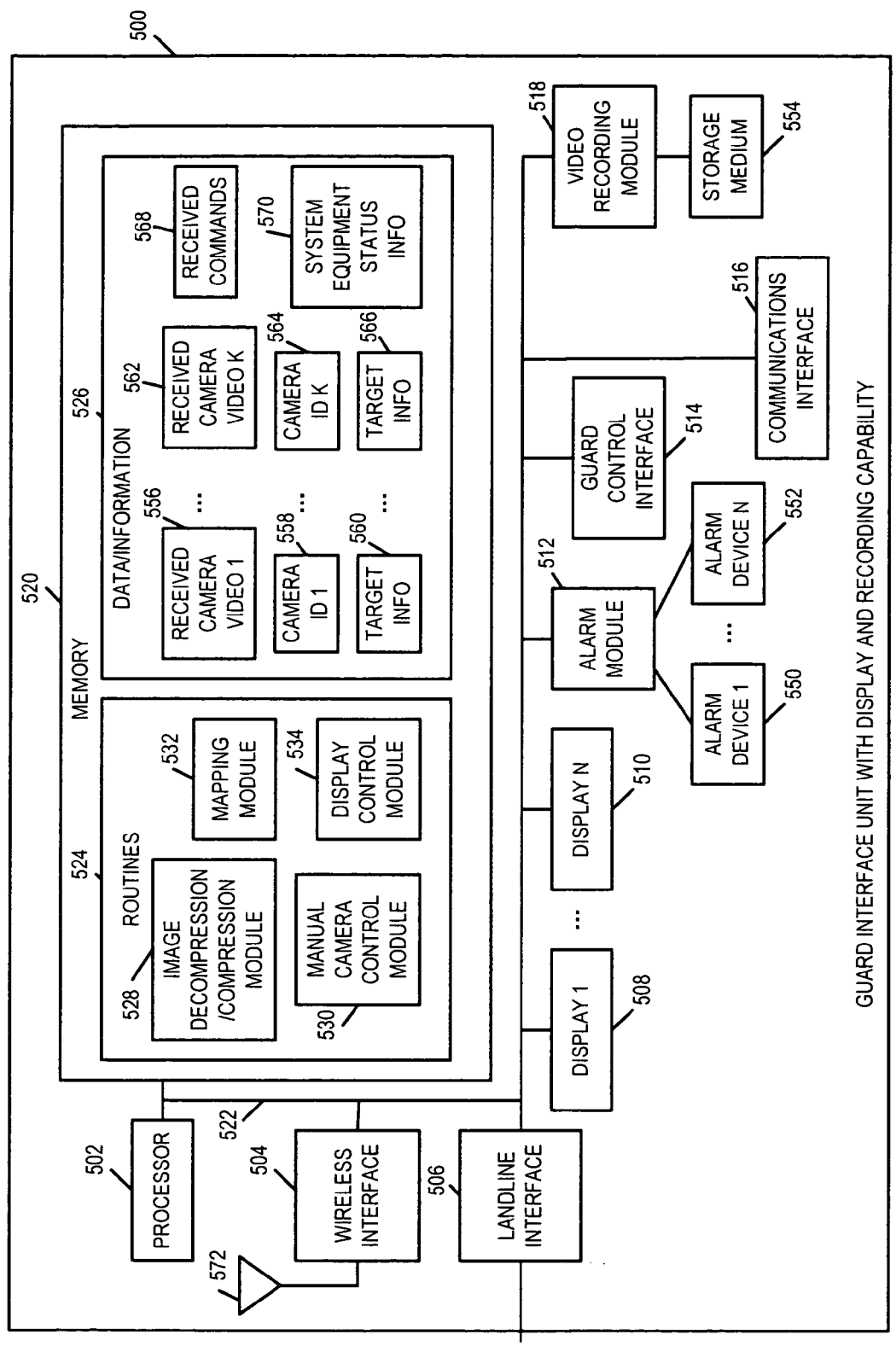
FIG. 5 is a drawing of an exemplary guard interface unit with display and recording capability implemented in accordance with the present invention and using methods of the present invention.

FIG. 5 is a drawing of an exemplary guard interface unit with display and recording capability 500 implemented in accordance with the present invention and using methods of the present invention. Exemplary guard interface unit 500 may be the guard interface unit 118 of system 100 of FIG. 1. Guard interface unit 500 includes a processor 502, a wireless interface 504, a landline interface 506, a plurality of displays (display 1 508, display N 510), an alarm module 512, a guard control interface 514, a communications interface 514, a video recording module 518, and memory 520 coupled together via a bus 522 over which the various elements may interchange data and information. Memory 520 includes routines 524 and data/information 526.

Guard interface unit 500 also includes a plurality of alarm devices (alarm 1 device 550, alarm N device 552) coupled to the alarm module 512. Alarm devices (550, 522) may include, e.g., buzzers, sirens, warning lights, vibration devices, audible loudspeaker devices, etc. Guard interface unit 500 also includes a storage medium 554 coupled to the video recording module 518, e.g., tape, magnetic disk storage, optical disk storage, memory chips, etc., used to store video images.

The processor 502, e.g., a CPU executes the routines 524 and uses the data/information 526 in memory 520 to control the operation of the guard interface unit 500 and implement the methods of the present invention.

Routines 524 include an image decompression/compression module 528, a manual camera control module 530, a mapping module 532, and a display control module 534. The image decompression/compression module 528 decompresses received compressed video, e.g., compressed MPEG video, from camera devices, so that it can be displayed. In addition, module 528, compresses video to store on storage medium 554 for later viewing. The compression method used for storage in storage medium 554, is different, in some embodiments, than the compression method used for video signals transmitted between a camera device and the guard interface unit 500. Manual camera control module 530 controls operations related to guard manual control, e.g., the guard directing video feed from a specified camera or the guard manually controlling the slew and zoom operations of a particular tracking camera device. Mapping module 532 maps received targets on a surveillance map so that the guard can have an overview of the situation. Mapping module 532 may also map a guard with a mobile unit 120 including a GPS module 146 as he/she proceeds to investigate the detected security breach. Display control module 534 control the display of video feed, e.g., following decompression, onto video displays (508, 510) so that the guard may observe the target.

As a result of an automatically confirmed target, e.g., based on detection from two cameras, the video feed from at least one of the cameras is enabled and sent to the guard interface unit 500, which via display control module 534 automatically displays the video. The notification to the guard interface unit 500 of the confirmed target is also received by the alarm module 512 which activates at least some of the alarm devices 550, 552 to alert the guard. In addition video recording module 518 automatically records the video, e.g., in a predetermined format, on storage medium 554.

In cases, where the system is operating in a degraded mode of operation, e.g., due to a failed camera device, and automatic target confirmation is not possible by two cameras at the target position, then the system triggers automatic alarm triggering, video feed, and video recording based on a single camera detection of a target.

Data/information 526 includes a plurality of sets of information corresponding to feeds from different cameras or the same camera at different times. For example one set of information includes received camera video 1 556, a camera ID 1 558, and target information 560. Received camera video 1 556 includes received compressed video imaged from camera 1, optionally include data/time tag information. Camera ID information 558 includes information uniquely identifying the camera which transmitted the video 556. Target information 560 includes target information, e.g., GPS location, target size, target velocity, target heading, associated with the target in video 556. In some embodiments, some target information 560 may be directed from the CCS 400, e.g., a precise position fix obtained through triangulation using multiple cameras. Another similar exemplary set of information includes received camera video K 562, camera ID K 564, and target info 566.

Data/information 526 also includes received commands 568, e.g., commands to trigger an alarm, start a video feed operation, start a recording operation, etc. Data/information 526 also includes system status information 570. System equipment status information 570 includes information, e.g., received from a CCS 400 identifying that a camera device or CCS has faulted and needs to be repaired/replaced. Received system status fault information may be used to trigger alarm indications, e.g., turning-on fault indicator lights on a control panel to notify the guard.

Alarm module 512 receives signals notifying the guard interface unit 500 of a detected target and the alarm module triggers at least some alarm devices (550, 552) to alert the guards. Alarm module 512 also triggers alarms due to received equipment failure indications.

Guard control interface 514 may be a control panel including switches and alarms, allowing a guard to manually select a camera for video display, take manual control of a tracking camera to perform zoom and slewing as desired, and to playback stored video from medium 554.

Communications interface 516 including a speaker and microphone allows a guard situated at the guard interface unit 500 to remain in contact with and direct another guard sent out to investigate the target, e.g., the investigating guard in the field having a mobile communications device 120, optionally including a GPS module 146.

Wireless interface module 504 is coupled to antenna 572. Wireless interface module 504 includes a wireless transmitter, wireless receiver, and a communications module which implements the communications protocols used. Wireless module 504 is used to communicate with other system 100 elements though a wireless router. The landline network module 506 includes line receivers and drivers, line protection devices, and a communication module implementing communications protocols. The landline network module 506 is used to communicate with other system 100 elements via a landline network router.

Figure 6:
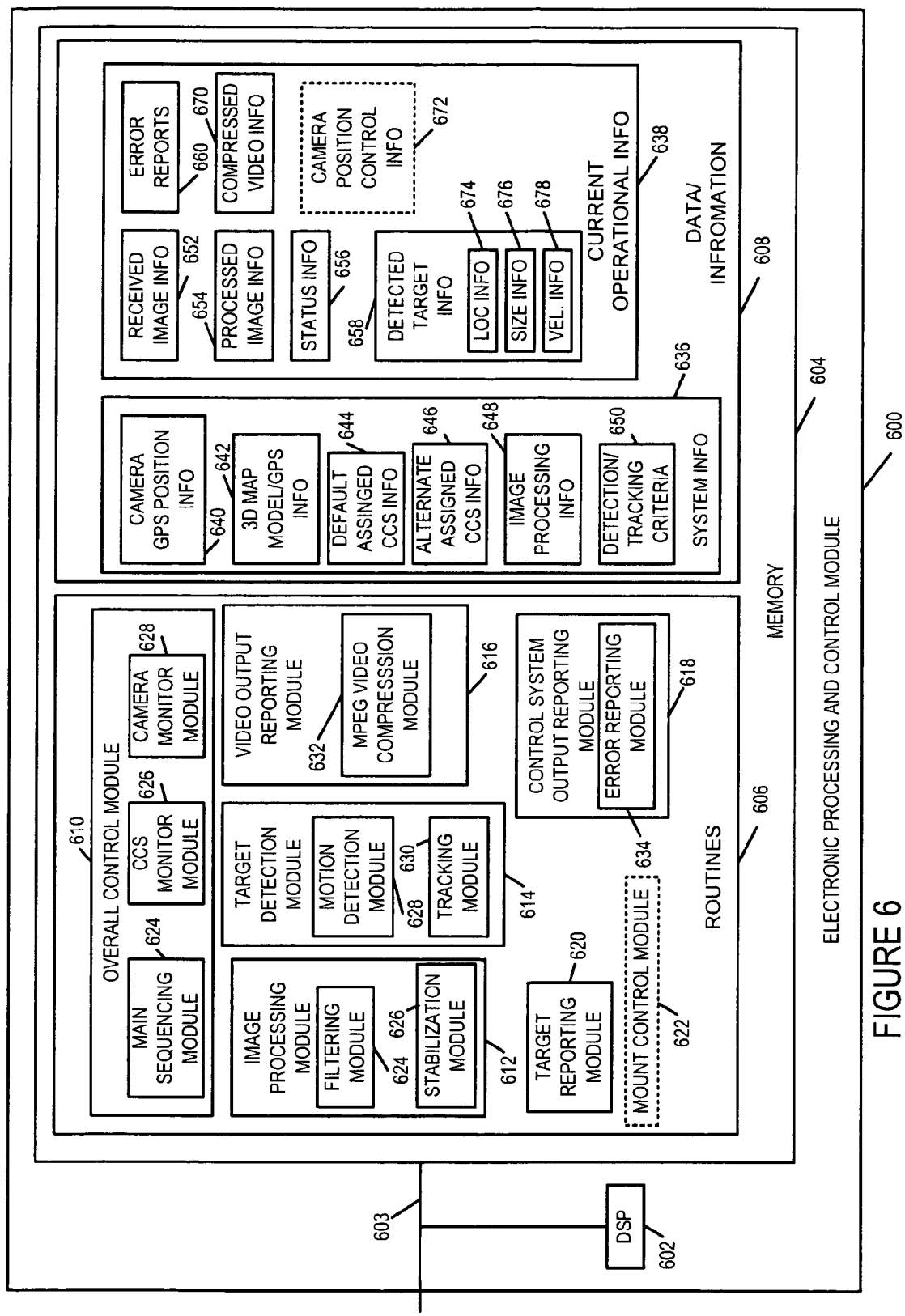
FIG. 6 is an exemplary electronic processing and control module implemented in accordance with the present invention and using methods of the present invention.

FIG. 6 is an exemplary electronic processing and control module 600 implemented in accordance with the present invention and using methods of the present invention. The exemplary electronic processing and control module 600 may be module 208 of detection camera device 200 of FIG. 2 or module 318 of tracking camera device 300 of FIG. 3. Exemplary electronic processing and control module 600 includes a DSP 602 and memory 604 coupled together via bus 603 over which the various elements may interchange data and information. The memory 604 includes routines 606 and data/information 608. The DSP 602 executes the routines 606 and uses the data/information in memory 608 to control operations in accordance with the methods of the present invention.

Routines 606 includes an overall control module 610, an image processing module 612, a target detection module 614, a video output reporting module 616, a control output reporting module 618, and a target reporting module 620. A mount control module 622 is included in tracking camera usage embodiments of module 600. General descriptions for each of the modules (610, 612, 614, 616, 618, 620, 622) have been previously described with respect to like named elements in FIGS. 2 and 3 and shall not be repeated for purposes of brevity. However, some included sub-modules shall now be described to provide addition detail.

Overall control module 610 includes a main sequencing module 624, a CCS monitor module 626, and a camera monitor module 628. Main sequencing module 624 controls the operation flow within module 600, e.g., performing initialization sequences and directing other modules to perform functions at the appropriate times. CSS monitor module 626 monitors the operation of the CCSs, determines whether it thinks the CSS is good or bad and generates a vote on the status of each CCS. Camera monitor module 628 monitors the operations of the camera device in which module 600 is embedded, e.g., performing self-test and checking for an anomalous behavior, e.g., a control loop is non-responsive, a measured limit is outside an acceptable range, etc.

Image processing module 612 includes a filtering module 624 and a stabilization module 626. Filtering module 624 removes noise from the image signal. Stabilization module 626 stabilizes the image, e.g., removing jitter due to camera shaking due to wind buffeting, etc. Stabilization module 626 may also remove jitter due to vibrations as a tracking camera is moved.

Target detection module 628 includes a motion detection module 628 and a tracking module 630. The motion detection module 628 detects motion of an object in the camera's field of view and decides if the motion corresponds to an object that should be considered a target. For example, the motion detection module 628 may be able to reject objects such as a moving squirrel, a moving bird, leaf motion as a target while accepting a moving person, moving car, moving boat, etc., as a legitimate target to be detected and tracked. Once a moving object is accepted as a target, target data, e.g. approximate target GPS position, size, and velocity may be collected and/or determined by the motion detection module 628. Target reporting module 620 sends target information to the CCS where it may be processed and/or forward to camera devices and/or the guard interface unit. In some embodiments under some conditions, target information is sent from one camera device to another camera device without having to traverse the CCS. In some embodiments under some conditions, target information is send from a camera device to guard interface unit without having to traverse the CCS.

Tracking module 630 continues to track the target as the target moves within the field of view of the camera. In a detection camera device, the tracking can include identifying a region within the camera's sensed field of view corresponding to an approximate GPS position. In the case of a tracking camera, the tracking module 630 can control the camera to zoom in on the target and can control to the camera to be repositioned the aim of the camera to follow the motion of the target through control signals via mount control module 622.

Video output reporting module 616 includes an MPEG compression module 632 which compress the camera video stream so that it can be transmitted more efficiently to the guard interface unit 118 where it may be displayed and stored.

Control system output reporting module 618 includes an error reporting module 634 which generates error and/or status reports based on information from CCS monitor module 626 and camera monitor module 628. The error reporting module 634 sends the generated reports to the CCSs.

Data/information 608 includes system information 636 and current operational information 638. System information 636 includes camera GPS position 640, three dimension map model/GPS information 642, default assigned CCS info 644, alternate assigned CCS info 646, image processing information 648, and detection/tracking criteria 650. GPS position 640 is a GPS position associated with the camera in which module 640 is installed, e.g., loaded at the time of system installation. Three dimension map model/GPS info 642 includes information corresponding to the terrain in which the camera including module 600 is situated which correlates specific points in the field of view to GPS coordinates. Default assigned CSS information 644 includes an identifier, e.g., an IP address associated with the CSS assigned to be the default controlling unit for the camera device, e.g., CCS A 114 in FIG. 1. Alternate assigned CSS information 646 includes an identifier, e.g., an IP address associated with the CSS assigned to be the alternate controlling unit for the camera device to be used in case of a failure with the default CCS, e.g., CCS B 116 in FIG. 1. Image processing information 648 includes filter and stabilization parameters used by the image processing module 612. Detection/tracking criteria 650 includes limits, e.g., target size limits, rate of motion limits, etc. used by target detection module 614 to designate a target and to determine if a tracking camera should be repositioned and to what degree or at what rate.

Current operation information 638 includes received image information 652, processed image information 654, status information 656, detected target information 658, error reports 660, compressed video info 670, and camera position control information 672. The received image information 652 is an input to the image processing module 612 and the processed image information 654 is an output of the image processing module 612. The target detection module may also modify the information output from the image processing module, e.g., adding a designator box around the target and such information may be included in processed image info 654. Status information 656 includes information on the status of the camera in which module 600 is embedded and the status of the CCS units. Detected target information 658 includes location information 674, e.g., a GPS target location, target size information 676, and target velocity information 678. Error reports 660 include generated errors reports from error reporting module 634 and received error reports, e.g., notifying the camera device that a CCS is considered failed and that the camera should now communicate via its alternate CCS. Compressed video information 670 is an output of MPEG video compression module 632. Camera position control information 672 includes signaling to/from mount control module 622.

Figure 7:
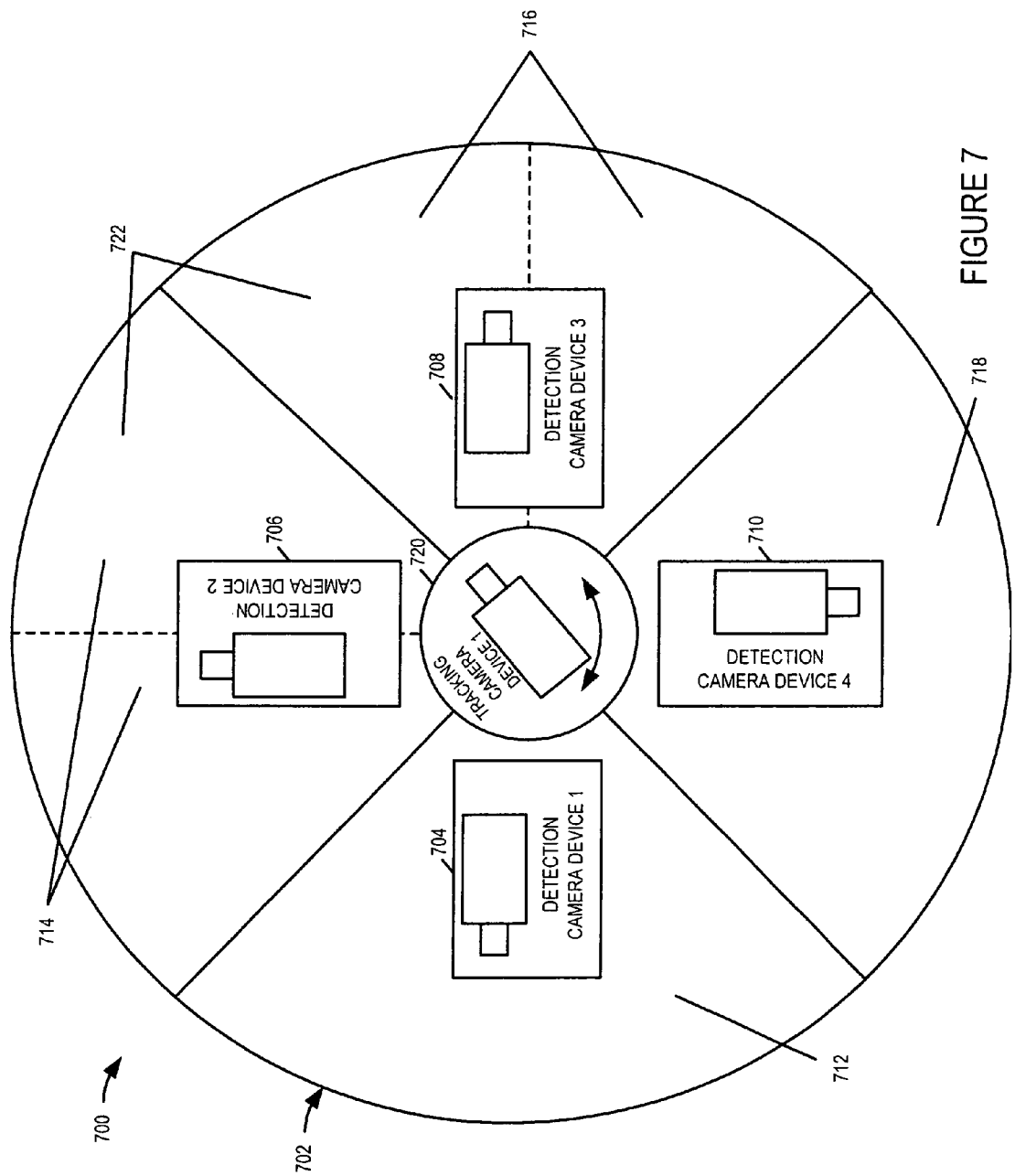
FIG. 7 is a drawing an exemplary coverage area and exemplary camera device deployment, in accordance with the present invention.

FIG. 7 is a drawing 700 an exemplary coverage area and exemplary camera device deployment, in accordance with the present invention. FIG. 7 shall be used to describe some of the features of the present invention. Consider a surveillance area 700 illustrated by the circle 702. Four detection camera devices (detection camera device 1 704, detection camera device 2 706, detection camera device 3 708, detection camera device 4 710) are deployed each with a coverage area (712, 714, 716, 718), respectively. Although shown with sharp boundaries in FIG. 7 for purpose of illustration, in general there is some overlap between coverage areas at the boundaries. A tracking camera device 720 with controllable rotary, tilt, and zoom is also shown. The tracking camera device has a coverage area 722 defined illustrated with dashed line boundaries. If one of the detection cameras, e.g., detection camera 704 detects a moving target in its coverage area, it obtains target information including and appropriate GPS target location. The target information is forwarded to the tracking camera device 720, which is controlled to reposition its camera to point to the area covered by detection camera 1 704, e.g., region 712. The tracking camera device 720 can be further adjusted based on the received GPS target coordinates from detection camera device 704, positioning the tracking camera and changing zoom setting to focus in on the target. Once the tracking camera detects the target, confirmation is sent to the centralized control system, and video can be forwarded to the guard interface unit and alarms activated. The tracking camera can continue to follow the movements of the target.

Figure 10:
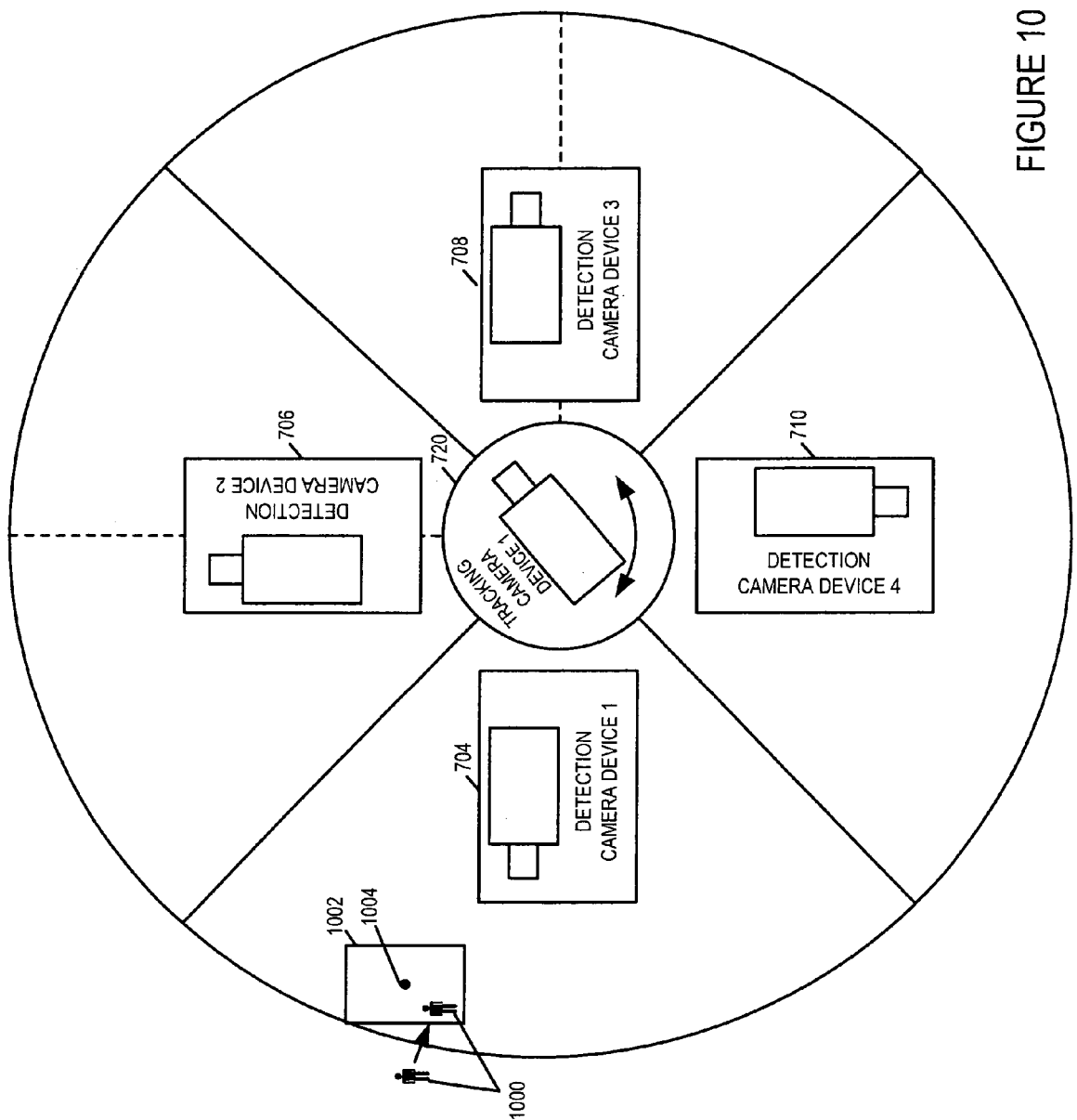
FIGS. 10, 11, and 12 illustrate an exemplary sequence where a moving target has been detected by a detection camera device, has been confirmed by a tracking camera device, and continues to be tracked by the tracking camera device as the target moves.
Figure 11:
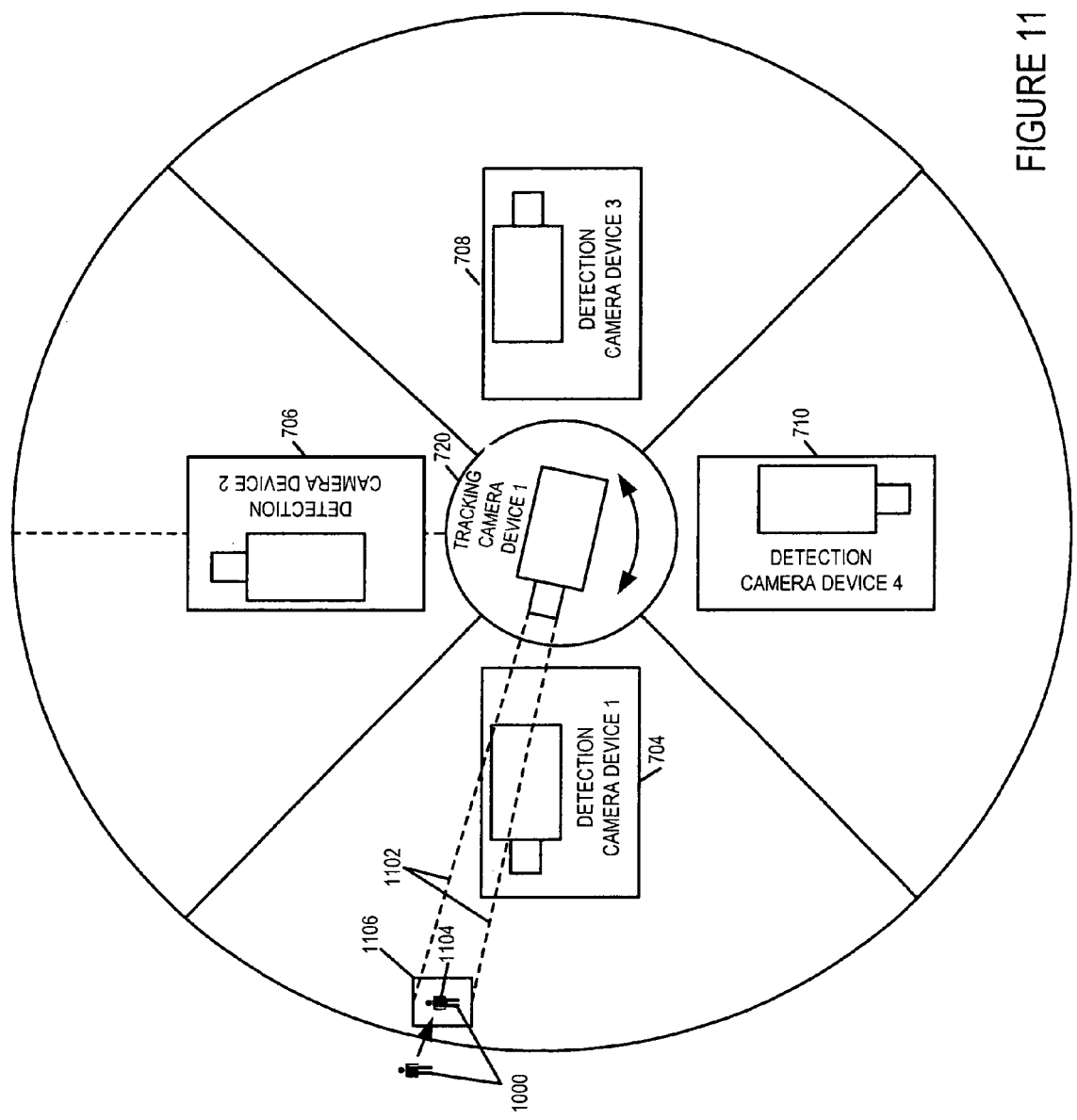
Figure 12:
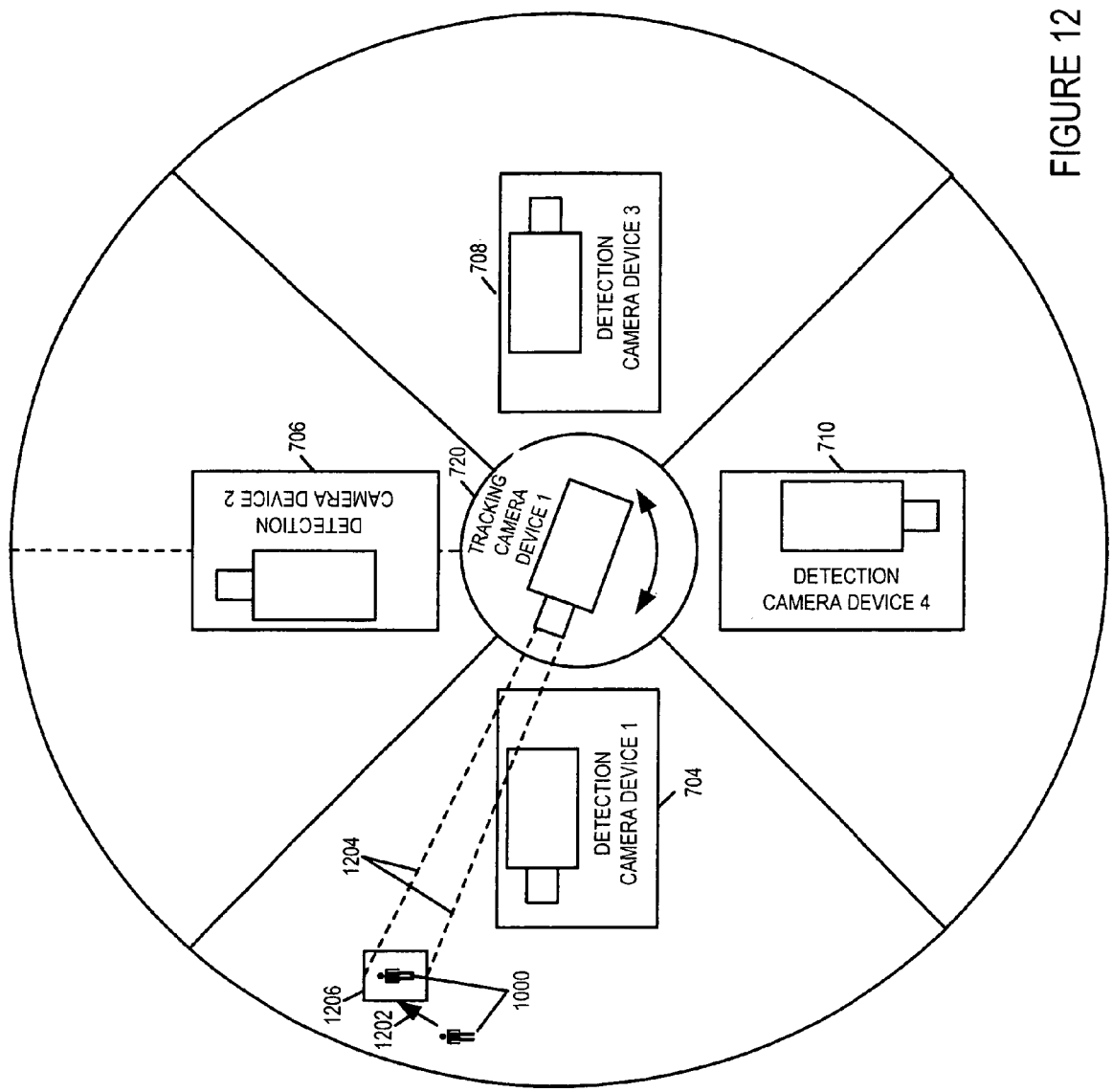

The sequence of FIGS. 10, 11 and 12 illustrates steps described above with respect to the drawing of FIG. 7. FIG. 10 shows an exemplary moving target 1000, e.g., an intruder, which has entered the surveillance detection field of view of detection camera 1 704, which detects the target 1000 identifies an approximate region of the target as indicated by boundary box 1002 and determines an approximate location, e.g., in 3D GPS coordinates, represented by point 1004. The target location information is forwarded to the tracking camera device 720, e.g., either via a centralized control system unit or directly. FIG. 11 shows that tracking camera device 720 has been position, e.g., rotary and tilt, and zoom controlled to focus in on the target performing a target confirmation and obtaining a more precise position 3D GPS position fix 1104 and obtaining higher resolution image data as indicated by the small box 1106 centered on target 1000. Dashed lines 1102 indicate that the coverage range of view of the tracking camera device is now smaller than the range of coverage of the detection camera device 704. Since the target has been confirmed, alerts are now sent to a guard interface unit. Video image information is now sent to the guard interface unit from the tracking camera device 720, and in some embodiments, also from the detection camera device 704. Just previously, the detection camera device 704 and the tracking camera device 720 had not been transmitting video image information. FIG. 12 illustrates that target 1200 has moved as indicated by arrow 1202 and the tracking camera device 720 has readjusted rotary and/or tilt camera pointing control angles and readjusted focus setting to keep the target in view as indicated by the location of dashed lines 1204 and box 1206, which is different from the location of dashed lines 1102 and box 1106 in FIG. 11.

Consider another scenario in which one of the detection camera devices, e.g., detection camera device 4 710 fails. The Centralized control system, detecting the failure, can command the tracking camera device to go into a back-up mode of operation to replace the failed detection camera 710. The tracking camera 720 can be commanded by the centralized control system to function as a detection camera replacing failed detection camera 4 710. The tracking camera 720 repositions itself to point and set its zoom setting such that it will be able to view the area normally covered by detection camera device 4 710, e.g., region 718. The tracking camera 720 remains with that fixed setting serving as a detection camera until such time a camera device 710 is repaired or replaced. In this way, in accordance with the present invention, coverage is maintained over the entire region. The CCS system changes the criteria to generate an alarm and forward camera video when the tracking camera device is not available to serve as a tracking camera, e.g., triggering alarms and forwarding video based on a single camera detection. A target can still be tracked in this configuration, albeit without the same degree of resolution that would be possible if the tracking camera was available to be moved and/or focus adjusted to follow the target. The tracking camera device 720 can resume it normal functions as a tracking camera when detection camera 710 is repaired or replaced.

Figure 13:
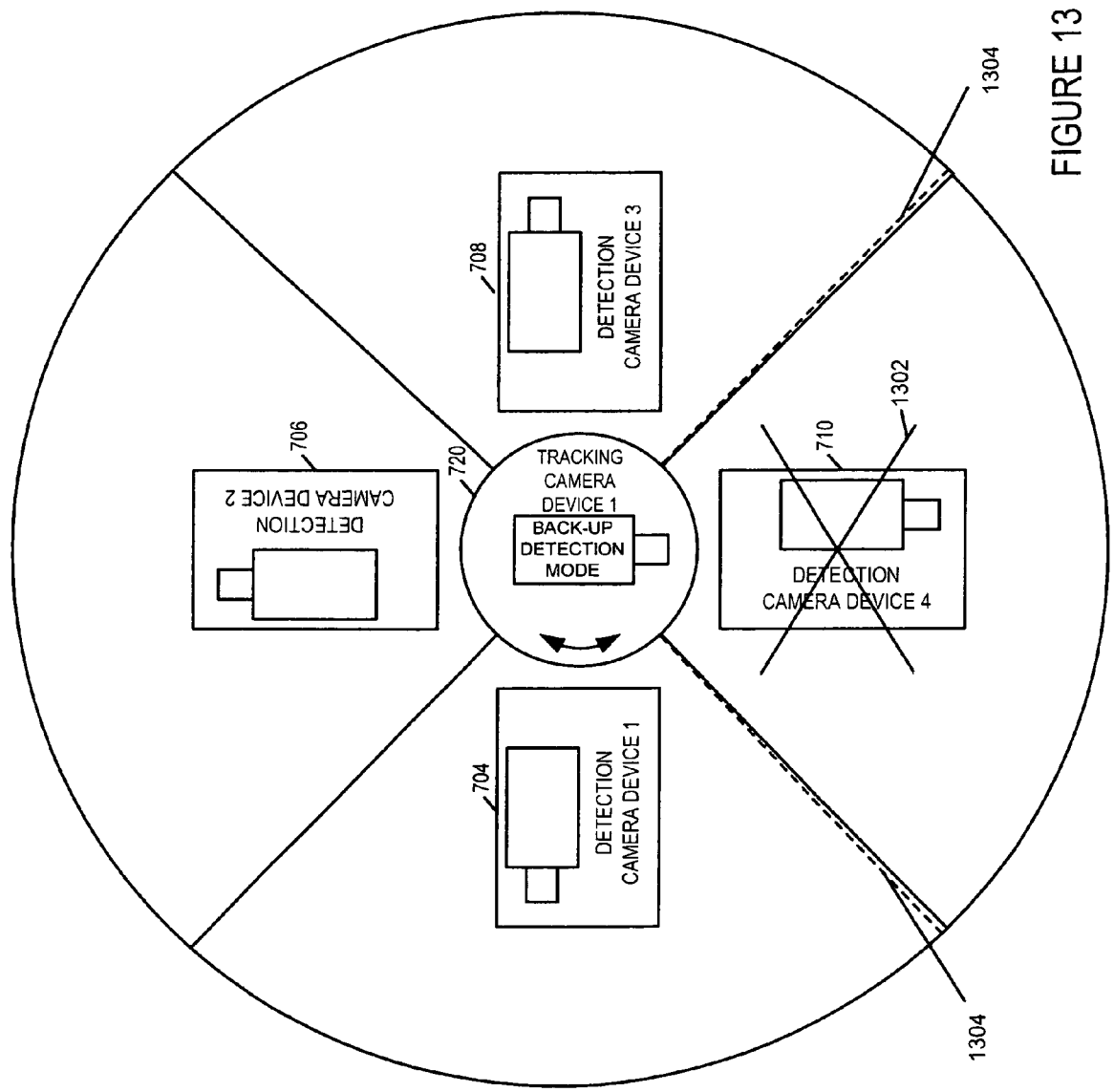
FIG. 13 illustrates an exemplary scenario where a detection camera device has faulted as indicated and a tracking camera device has been repositioned and focus adjusted to temporarily function in back-up detection mode replacing faulted detection camera device.

FIG. 13 illustrates the exemplary scenario described above, where detection camera device 4 710 has faulted as indicated by the X mark 1302 and tracking camera device 720 has been repositioned and focus adjusted to temporarily function in back-up detection mode replacing faulted detection camera 710. The surveillance area now covered by camera device 720 is indicated by the region bordered by dashed lines 1304 and the outer perimeter of the circle which encompasses the region previously covered by detection camera device 4 before it failed.

Figure 8:
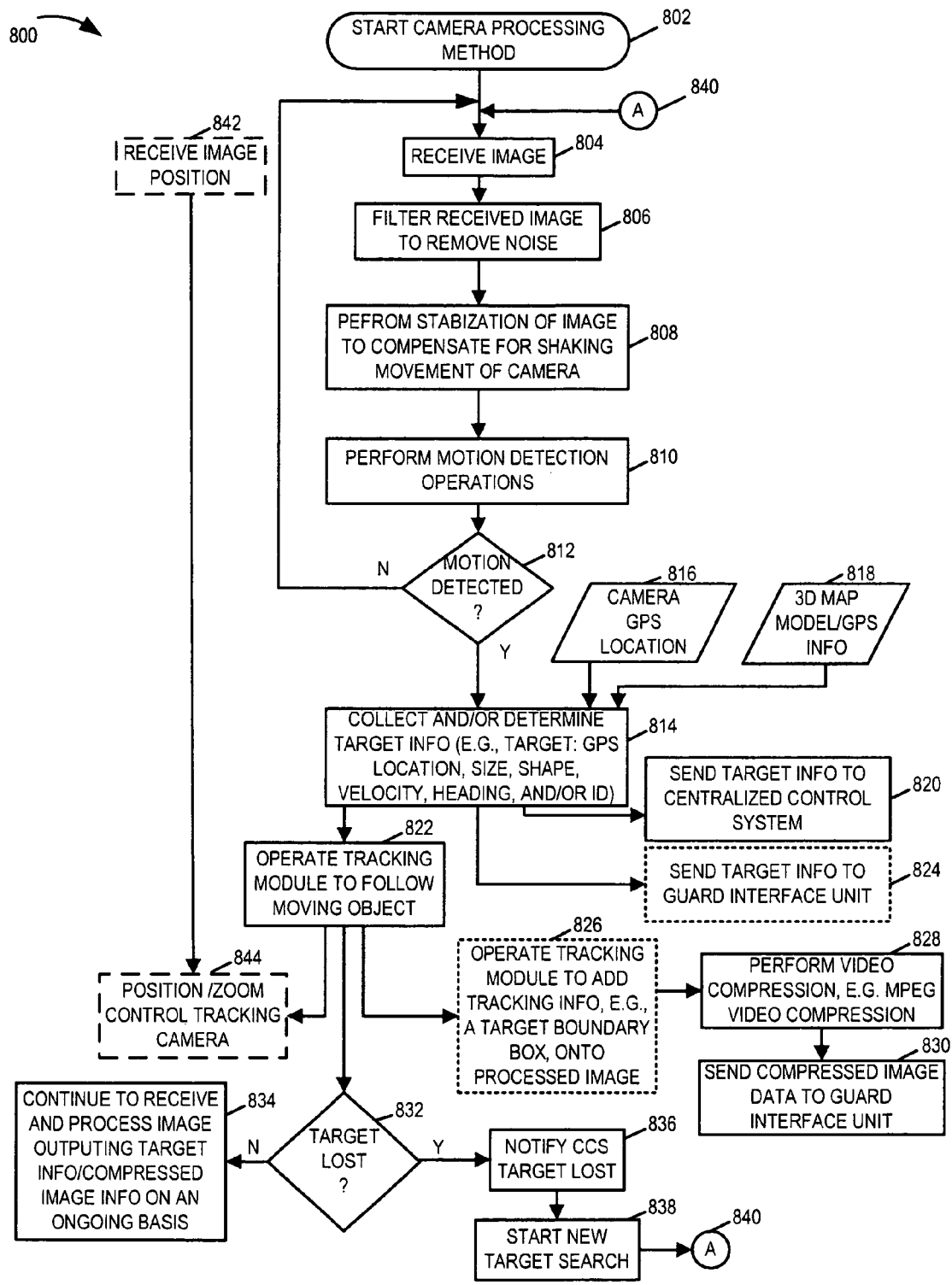
FIG. 8 is a drawing of an exemplary camera processing method that may be performed by a smart camera device in accordance with the methods of the present invention.

FIG. 8 is a drawing 800 of an exemplary camera processing method 800 that may be performed by a smart camera device in accordance with the methods of the present invention. The exemplary camera device performing exemplary method 800 may be the exemplary detection camera device of FIG. 2 or the exemplary tracking camera device of FIG. 3. Operation starts in step 802, where the camera device is powered on and initialized. The camera device is operated to use a default assigned centralized control system. If the camera device is a tracking camera device, the settings, e.g., rotary, tilt, zoom, may be set to stored start settings. Operation proceeds from start step 802 to step 804. In step 804 the camera device is operate to receive an image. For example, an image of a surveillance area is received through a lens and imager device, and an output signal is sent to an electronic processing and control module. Operation proceeds from step 804 to step 806.

In step 806, the camera device filters the received image to remove noise. Then, in step 808, the camera device performs stabilization of the image to compensate for shaking of the camera, e.g., due to wind buffeting of the camera. Operation proceeds from step 808 to step 810. In step 810, the camera device is operated to perform motion detection operations. Motion detection operations may include identifying moving objects in its field of view and distinguishing between (i) detected moving objects that should not be classified as targets, e.g., small moving animals, blowing leaves, swaying branches, etc, and (ii) legitimate moving detected targets, e.g., large moving objects such as people, cars, boats, etc. Operation proceeds from step 810 to step 812. In step 812 operational flow is directed based upon motion detection of a potentially legitimate target. If there is no motion detected of potentially legitimate targets, then operation returns to step 804 for additional image reception operations. However, if a potentially legitimate moving target was detected in step 810, then operation proceeds from step 812 to step 814.

In step 814, the camera device is operated to collect and/or determine target information, e.g., target: GPS location, size, shape, velocity, heading, category identification, and/or individual identification. The camera device uses stored information, e.g., the camera GPS location 816 and 3D map model/GPS information 818 in determining target information. The GPS camera location 816 and 3D map/model GPS information of the surveillance area 818 may have been stored in the camera device as part of system initialization and calibration process performed during system installation. Operation proceeds from step 814 to step 820 and step 822. In some embodiments operation also proceeds from step 814 to step 824.

In step 820, the camera device is operated to send target information, e.g., including a GPS coordinates associated with the target, to the centralized control system. If the camera device sending the information is a detection camera device, the received image position, e.g., target GPS coordinates, is typically forwarded by the CCS to a selected tracking camera device which can view the same area and confirm the detection.

In step 822, a tracking module included in the camera device is operated to track and follow the moving detected target object, the tracking and following including the reception and processing of additional images. The tracking processes vary depending upon whether the smart camera device is a detection camera device or a tracking camera device. For example, a detection camera device may track by performing operations including recognizing that a target is moving between different pixels within it set field of view, the different pixels associated with different locations. A tracking camera device, which includes a controllably positioned camera may zoom in-zoom out, readjust rotary and tilt as the target moves, e.g., attempting to follow the target and keep the target centered in its field of view.

In some embodiments, the target information is sent from the camera device to a guard interface unit in step 824. In some embodiments, the centralized control unit is responsible for sending and/or deciding when to send target information to the guard interface unit, e.g., typically after initial target detection by a detection camera device and target confirmation by a tracking camera device.

Operation proceeds from step 822 to step 826 and step 832. Step 826 is an optional step which may be bypassed in some embodiments. In optional step 826, the tracking module in the smart camera device is operated to add tracking information, e.g., a target boundary box, onto the processed image. Other added information may include, estimated target GPS position, target ID information, image date/time tag information, and/or camera identification information.

Operation proceeds from step 826 to step 828. In step 828, the camera device is operated to perform compression, e.g., MPEG video compression. Then, in step 830, the camera device is operated to send compressed video image data to the guard interface unit. In some embodiments, the CCS controls when and which camera devices forward video to the guard interface unit based on an automated target detection and/or target confirmation protocol. In some embodiments, a tracking camera device, having been directed to confirm a target previously detected by a detection camera device, automatically forwards video data to the guard interface unit when it confirms the target.

In step 832, the camera device is operated to check if the target is lost. For example, a target may be lost by a particular camera device when the target moves out of the surveillance range of the camera device. If the target is not lost, operation proceeds to step 834, where the camera device is operated to continue to receive and process images, outputting target information/compressed image information on an ongoing basis. If in step 832, the camera device determines that it has lost the target, operation proceeds to step 836. In step 836, the camera device notifies the CCS of the target loss. Operation proceeds from step 836 to step 838, where a new search is started. Operation proceeds from step 838 via connecting node A 840 back to step 804.

Steps 842 and steps 844 are steps that are performed if the camera device is a tracking camera device. In step 842, the tracking camera device receives image position information, e.g., an estimated target fix in GPS coordinates of a target detected by a detection camera device, the detection location being in a region that can be viewed by the tracking camera device. In some embodiments, the location information is received from a CCS, the CCS having received target information from a detection camera device; the CCS having selected the tracking camera device to perform the detection confirmation operation, forwards target location information to the selected tracking camera device. In some embodiments, the target location information may be sent from a detection camera device to a tracking camera device without traversing the CCS, predetermined information being stored in the camera devices designating which detection camera devices are associated with which tracking camera devices for designated areas.

Operation proceeds from step 842 to step 844, e.g., to set up the tracking camera device with initial settings expected to provide a field of view that should capture the target detected by the detection camera device. In step 842, the tracking camera device is position/zoom controlled to detect and/or track a target.

Operation can also proceed to step 844 from step 822, e.g., as the tracking camera device is readjusted to focus in on and/or follow a detected target which may have moved since the last position/zoom adjustment.

Figures 9, 9A, 9B:
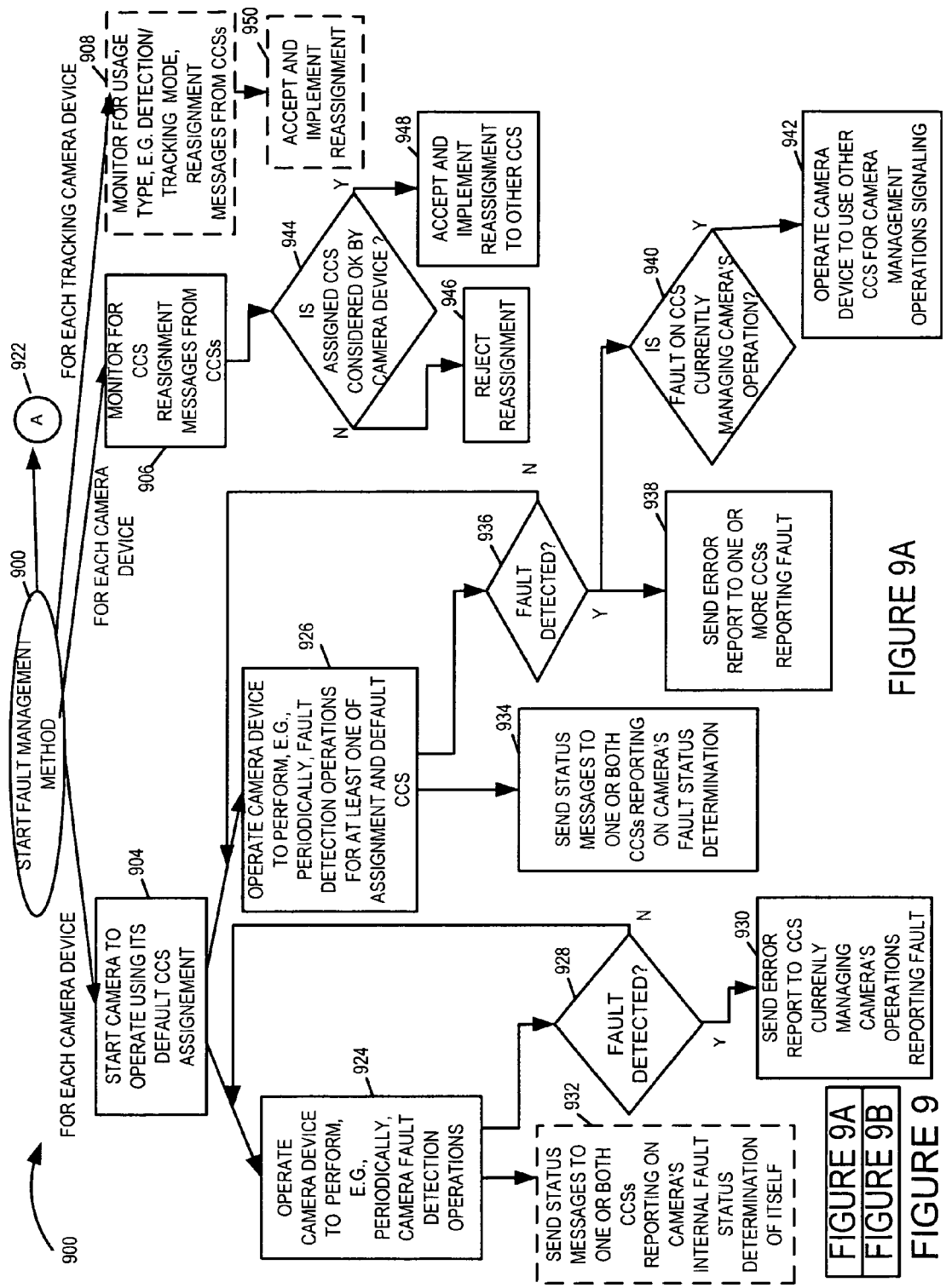
FIG. 9 comprising the combination of FIG. 9A
FIG. 9B is a drawing of a flowchart of an exemplary method of performing fault management in an exemplary surveillance system in accordance with the present invention.
Figure 9B:
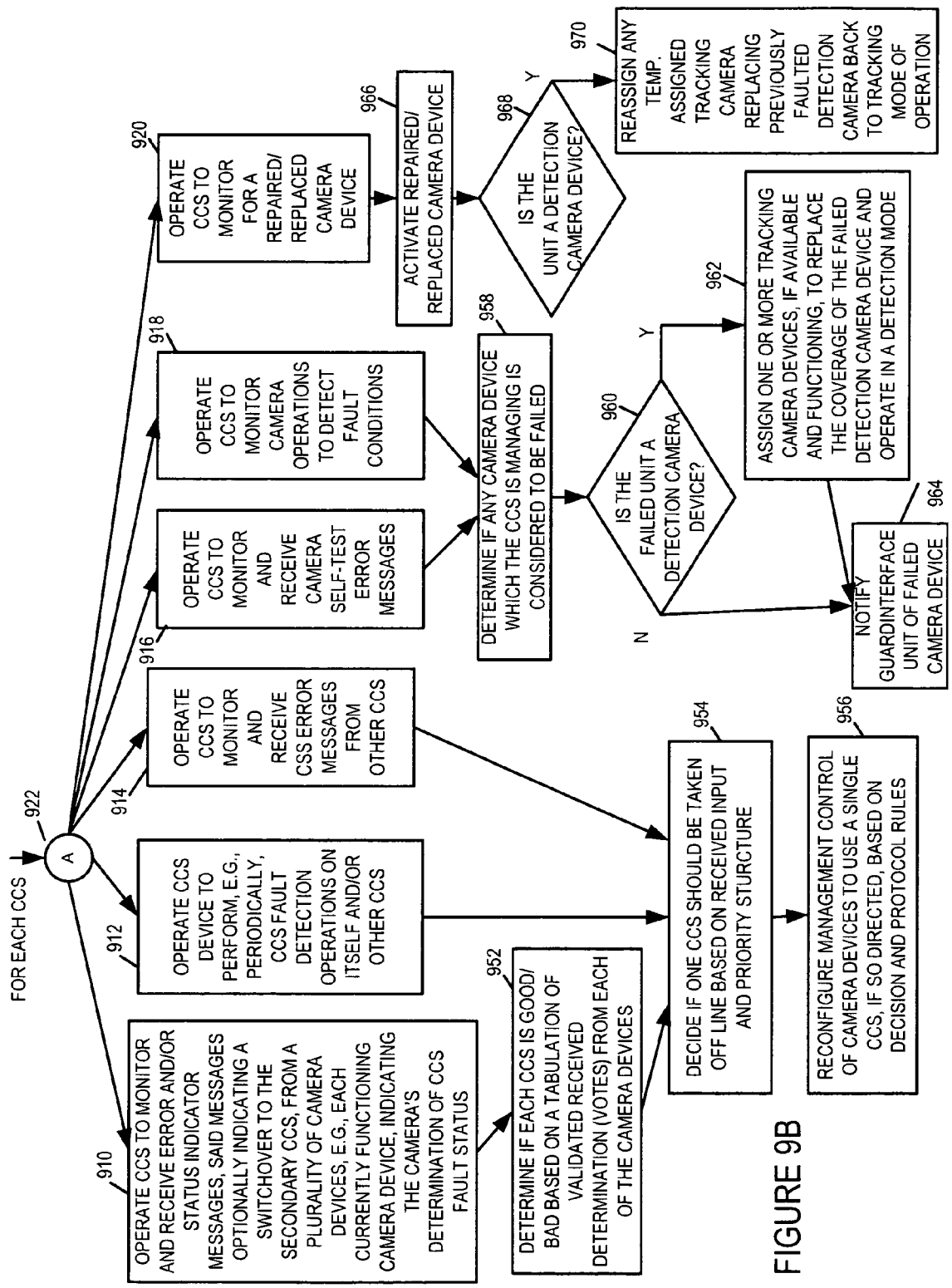

FIG. 9 comprising the combination of FIG. 9A and FIG. 9B is a drawing of a flowchart 900 of an exemplary method of performing fault management in an exemplary automated threat detection and tracking system, e.g., system 100 of FIG. 1 in accordance with the present invention.

The exemplary method starts in step 902 where the detection and tracking system is powered on. For each camera device (102, 104, 106, 108, 110, 112), operation proceeds from step 902 to steps 904 and 906. For each tracking camera device (110, 112), operation also proceeds from step 902 to step 908. For each centralized control system (CCS) (114, 116), operation proceeds from step 902 to steps 910, 912, 914, 916, 918 and 920 via connecting node A 922.

In step 904, the camera device is started to operate using its default CCS assignment. Operation proceeds from step 904 to step 924 and step 926. In step 924, the camera device is operated to perform, e.g., periodically, camera fault detection operations. Operation proceeds from step 924 to step 928. In step 928, the camera device is operated to perform a check as to whether or not a fault was detected. If a fault was detected, operation proceeds to step 930; otherwise operation proceeds to step 924 for additional fault detection operations. In step 930, the camera device is operated to send an error report to the CCS currently managing the camera's operations reporting the fault condition.

In some embodiments, operation also proceeds from step 924 to step 932. In step 932, the camera device is operated to send status messages to one or both CCSs reporting on the camera's internal fault status determination on itself.

Returning to step 926, in step 926, the camera device is operated to perform, e.g., periodically, fault detection operations for at least one of assignment and default CCS units. Operation proceeds from step 926 to step 934 and step 936. In step 934, the camera device is operated to send status messages to one or both CCSs reporting on the camera's fault status determination. In some embodiments, the status message or messages includes a pass/fail bit for each CCS representing a vote on each CCS. In step 936, the operational flow is directed depending upon whether or not a fault was detected in step 926. If a fault was detected in step 926, then operation proceeds from step 936 to step 938 and step 940; otherwise operation proceeds from step 936 back to step 926 for additional fault detection operations on the CCS units. In step 938, the camera device is operated to send an error report to one or more CCSs reporting the fault. The error report may include specific information on the detected fault condition, e.g., not able to communicate with CCS, intermittent communications channel, failure to receive acknowledgement/ negative acknowledgement, checksum fails, synchronization error, unreasonable commands received, not responding to requests, etc.

In step 940, the camera device is operated to check as to whether the fault is on the CCS currently managing the camera device's operations. If the detected failure is on the CCS currently managing the camera device, then operation proceeds to step 942. In step 942, the camera device is operated to use the other CCS for camera management operations, e.g., switching from its designated default CCS to its designated alternate CCS.

Returning to step 906, in step 906, the camera device is operated to monitor for CCS reassignment messages from CCSs. If a reassignment message is received in step 906, then operation proceeds to step 944. In step 944, the camera device tests as to whether or not the assigned CCS is considered ok by the camera device. If the assigned CCS is considered to be no good by the camera device, the camera device rejects the assignment in step 946. However, if the assigned CCS is consider to be ok by the camera device, the camera device accepts and implements the reassignment to the other CCS in step 948.

Returning to step 908, in step 908, the tracking camera device is operated to monitor for usage type, e.g., detection/ tracking mode reassignment messages from the CCSs. For example, a tracking camera device can be temporarily reassigned to function as a detection camera device to replace a faulted detection camera device. Alternatively, a tracking camera device temporarily functioning as a detection camera, can be restored to a tracking camera mode of operation when the detection camera device which had failed has been repaired/replaced. Operation proceeds from step 908 to step 950. In step 950, the tracking camera device is operated to accept and implement reassignment.

Centralized control system (CCS) operation shall now be described. In step 910, the CSS is operated to monitor and receive error and/or status indicator messages, said messages optionally indicating a switchover to the secondary CCS, from a plurality of camera devices, e.g., each currently functioning camera device, indicating the camera device's determination of CCS fault status. Operation proceeds from step 910 to step 952. In step 952, the CCS is operated to determine if each CCS is good or bad based on a tabulation of validated received determinations, e.g., votes, from each of the camera devices.

Returning to step 912, in step 912, the CCS is operated to perform, e.g., periodically, CCS fault determination operations on itself and/or other CCSs. The checks of step 912 may include self-tests such as hardware checks, reasonableness checks, time overload checks, software warnings, e.g., divide-by-zero, etc. The checks of step 912 may also include checks of the other CCS, e.g., via link 144. For example, a heartbeat signal, a watchdog timer signal, hardwired fault indication signals, and/or power supply voltages, of the other CCS can be monitored.

Returning to step 914, in step 914, the CCS is operated to monitor and receive CCS error messages from other CCSs. For example, the error messages may include information indicating the results of self-test operations by a CCS.

Operation proceeds from step 952, 912, and 914 to step 954. In step 954, the CCS decides if one CCS should be taken off line based on received input from steps 952, 912 and 914 and in view of the priority structure. Operation proceeds from step 954 to step 956. In step 956, the CCS is operated to reconfigure management control of camera devices to use a single CCS, if so directed, based upon the decision of step 954 and the protocol rules of the fault management.

Returning to step 916, in step 916, the CCS is operated to monitor and receive camera self-test error messages. In step 918, the CCS is operated to monitor camera operations to detect fault conditions. Operation proceeds from step 916 and 918 to step 958. In step 958, the CCS is operated to determine if any camera device, which the CCS is managing is considered to be failed. If a failure is detected for a managed camera device operation proceeds from step 958 to step 960. In step 960, the CCS determines as to whether the failed unit is a detection camera device. If the failed unit, is a detection camera device, then operation proceeds from step 960 to step 962, otherwise operation proceeds to step 964. In step 962, the CCS is operated to assign one or more tracking camera devices, if available and functioning, to replace the coverage of the failed detection camera device and operate in a detection mode. Operation proceeds from step 962 to step 964. In step 964, the CCS is operated to notify the guard interface unit of the failed camera device.

Returning to step 920, in step 920, the CCS is operated to monitor for a repaired/replaced camera device. If a repaired/replaced camera device is detected in step 920, then in step 966, the CCS is operated to activate the repaired/replaced camera device. Operation proceeds from step 966 to step 968. In step 968, the CCS is operated to check if the replaced/replaced unit is a detection camera device. If it is determined that the repaired/replaced unit is a detection camera device, then operation proceeds from step 968 to step 970. In step 970, the CCS is operate to reassign any temporarily assigned tracking camera devices replacing the previously faulted detection camera device back to a tracking mode of operation.

In various embodiments elements described herein are implemented using one or more modules to perform the steps corresponding to one or more methods of the present invention. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware which may be part of a test device, to perform one or more of the steps of the above-described method(s).

Numerous additional variations on the methods and apparatus of the present invention described above will be apparent to those skilled in the art in view of the above description of the invention. Such variations are to be considered within the scope of the invention.

What is claimed is:

1. A security method comprising:
    operating a first camera device including a first lens, a first imager device, and a first processor to generate digital images of a first region;
    operating the first camera device to perform, within said first camera device, a target detection operation on at least one image detected by said first camera device; and
    operating the first camera device to transmit a first target signal relating to a detected target to a second camera device when said target detection analysis determines the presence of a target in an image detected by said first camera device, said first target signal providing target location information to the second camera device without said target location information traversing a centralized control system (CCS), said second camera device including a second lens, a second imager device and a second processor;
    operating the second camera device to monitor a portion of said first region in which the first camera device detected a target following generation of the first target detection signal by the first camera device;
    operating the centralized control system to control which one of a plurality of tracking cameras is associated with the first camera for purposes of confirming detection of a target detected by the first camera, one of the plurality of tracking cameras being said second camera;
    wherein said first camera device is a fixed mount camera device;
    wherein said second camera device is a movable mount camera device including a motor for adjusting the position of the camera device; and
    wherein the first camera device and the second camera device are part of a security system which includes more fixed mount camera devices than movable mount camera devices.

2. The security method of claim 1, further comprising:
    storing in said first camera device information designating the second camera device as being associated with said first camera device
    operating, immediately prior to detection of said target, the first camera device in a first mode in which the first camera device does not output video; and
    operating the first camera device, following detection of said target by the first camera device, to transition from said first mode of operation to a second mode of operation in which video signals including images of the detected target are transmitted by said first camera device.

3. The security method of claim 1, further comprising:
    operating the second camera device to perform a target detection analysis on at least one image corresponding to said portion of said first region detected by said second camera device; and
    in response to detection of a target by the second camera device in the portion of said first region, operating the second camera device to transmit a second target detection signal indicating detection of a target.

4. The method of claim 3, further comprising:
    operating both the first and second camera devices, following detection of a target by said second camera device, to output video signals including the detected target to a guard interface unit including at least one of a video display device and a video recording device.

5. The method of claim 3,
    further comprising:
    operating the second camera device to adjust its portion to capture images of said portion of the first region in which said first camera device detected a target following generation of said first target detection signal by said first camera device.

6. The method of claim 5, wherein the security system includes at least four times the number of fixed mount camera devices then it includes movable mount camera devices.

7. The method of claim 3, wherein the first camera device, second camera device, and centralized control system are separate physical devices that are coupled together by a network which supports IP communications.

8. The method of claim 7, wherein said centralized control system selects the second camera device to monitor at least the portion of the first region.

9. The method of claim 7, further comprising:
    operating the centralized control system to signal at least one of the first and second camera devices to transmit video to a guard interface unit in response to determining that the second camera device detected a target that in the same portion of the first region in which the first camera device detected a target.

10. The method of claim 3, further comprising:
    storing, in at least one of (i) the first camera device, or (ii) the second camera device, terrain map information which can be associated with the location of an image generated by one of said first and second camera devices.

11. The method of claim 10, further comprising:
operating the centralized control system to triangulate the position of a target detected by multiple camera devices in said security system based on global position system coordinates provided by a plurality of camera devices which detected the target and camera device pointing angle information.

12. The method of claim 1, further comprising:
operating the first camera device to use camera GPS location information and a 3D map model of a surveillance area stored in the first camera device to determine the GPS location of the detected target.

13. The method of claim 1, wherein operating the first camera device to detect a target includes identifying moving objects in a field of view and distinguishing between detected moving objects that should not be classified as targets and moving detected targets which are considered legitimate targets.

14. The method of claim 1,
wherein the first camera device generates an electrical representation of an image and detects said moving target; and
wherein said second camera device captures video images of said moving target and confirms the detection of the target by the first camera device.

15. The security method of claim 1, wherein said first camera device includes a camera device housing in which said processor is located, said step of operating the first camera device to transmit said first target detection signal including transmitting said first target detection signal outside the camera device housing.

16. A security method comprising:
operating a first camera device including a first lens, a first imager device, and a first processor to generate digital images of a first region;
operating the first camera device to perform, within said first camera device, a target detection operation on at least one image detected by said first camera device;
operating the first camera device to transmit a first target signal relating to a detected target to a second camera device when said target detection analysis determines the presence of a target in an image detected by said first camera device, said first target signal providing target location information to the second camera device without said target location information traversing a centralized control system (CCS), said second camera device including a second lens, a second imager device and a second processor;
operating the second camera device to monitor a portion of said first region in which the first camera device detected a target following generation of the first target detection signal by the first camera device;
wherein said target location information provided to the second camera device includes an estimated target fix in GPS coordinates of a target detected by the first camera device;
wherein said first camera device is a fixed mount camera device;
wherein said second camera device is a movable mount camera device including a motor for adjusting the position of the camera device; and
wherein the first camera device and the second camera device are part of a security system which includes more fixed mount camera devices than it includes movable mount camera devices.

17. A security system comprising:
a centralized control system for controlling camera devices in said security system;
a second camera device;
a first camera device including:
a camera module for generating signals corresponding to a first region being monitored by said camera module;
a processor coupled to said camera module for generating digital images of the first region from the signals generated by said camera module;
a target detection module for receiving said digital images of the first region, the target detection module being enabled to perform a target detection operation on at least one digital image of the first region; and
a first transmission module enabled to transmit a first target detection signal indicating detection of a target to the second camera device without traversing said centralized control system, when target detection analysis performed by said target detection module determines the presence of a target in an image detected by said first camera device;
wherein, said second camera device is separate from said first camera device and said centralized control system and is configured to monitor a portion of said first region in which the first camera device detects a target in response to the first target detection signal from the first camera device;
wherein the centralized control system is configured to control which one of a plurality of tracking cameras is associated with the first camera for purposes of confirming detection of a target detected by the first camera, one of the plurality of tracking cameras being said second camera device;
wherein said first camera device is a fixed mount camera device;
wherein said second camera device is a movable mount camera device including a motor for adjusting the position of the camera device; and
wherein said security system, which includes the first camera device and the second camera device, includes more fixed mount camera devices than movable mount camera devices.

18. The system of claim 17,
wherein said camera module, said processor, said target detection module, and said first transmission module are located in a first camera housing; and
wherein the first camera device further includes:
an overall control module for controlling said first camera device to operate in a plurality of different modes of operation at different points in time, said overall control module controlling the camera device to operate in a first mode in which the first camera device does not output video outside said first camera housing during a period of time during which the camera device does not detect a target; and to, following detection of a target by the first camera device, to transition from said first mode of operation to a second mode of operation in which video signals including images of the detected target are transmitted by said first camera device.

19. The system of claim 17,
wherein the second camera device includes:
a second camera housing and, mounted within said second camera housing:

a mount control module for controlling the direction in which said second camera device points in response to a control signal received after the first camera device detects a target;

a second target detection module enabled to perform a target detection analysis on at least one image corresponding to said portion of said first region detected by said second camera device; and a second transmission module enabled to transmit a second target detection signal indicating detection of a target in response to detection of a target by the second camera device in the portion of said first region.

20. The system of claim 19, wherein said first and second cameras are coupled together by a communications link thereby enabling target detection signals generated by the first camera device to be received by said second camera device.

21. The system of claim 19, wherein at least one of the first and second target detection signals includes global position coordinate information which provides target position information.

22. The system of claim 19, wherein said second camera includes a zoom lens to capture images of said portion of the first region in which said first camera device detects a target.

23. The system of claim 22, wherein the system includes at least four times the number of fixed mount camera devices then it includes movable mount camera devices.

24. The system of claim 22, wherein a network which supports IP communications couples the first camera device and second camera device are coupled to the centralized control system; and wherein the centralized control system includes:

a receiver for receiving target detection signals; and a transmitter for sending a signal to the second camera device to cause the second camera device to monitor at least the portion of the first region in which said first camera device detects a target as indicated by a target detection signal received from the first camera.

25. The system of claim 24, wherein said centralized control system further includes:

a control module for selecting the second camera device to monitor at least the portion of the first region from a plurality of camera devices included in said system based on received target position information.

26. The system of claim 24, further comprising:

a control module for controlling said transmitter to signal at least one of the first and second camera devices to transmit video to a guard interface unit in response to determining that the second camera device detected a target in the same portion of the first region in which the first camera device detected a target.

27. The system of claim 19, wherein the centralized control system includes:

a data storage device which stores terrain map information which can be associated with the location of an image generated by one of said first and second camera devices.

28. The system of claim 27, wherein said centralized control system further comprises:

a target position triangulation module enabled to triangulate the position of a target detected by multiple camera devices in said system based on global position system coordinates provided by a plurality of camera devices which detected the target and camera device pointing angle information.

29. The system of claim 17, wherein the first target detection signal includes global position coordinates indicative of the location of the detected target.

* * * * *